(12) United States Patent
Rahman et al.

(10) Patent No.: US 12,058,034 B2
(45) Date of Patent: Aug. 6, 2024

(54) SYSTEM AND METHOD FOR ANALYTICS BACKED SOFTWARE DEFINED NETWORK FAILURE DETECTION AND SYNCHRONIZATION

(71) Applicant: AT&T Intellectual Property I, L.P., Atlanta, GA (US)

(72) Inventors: Moshiur Rahman, Marlboro, NJ (US); Laurens McCarty, San Jose, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 17/842,531

(22) Filed: Jun. 16, 2022

(65) Prior Publication Data

US 2023/0412491 A1 Dec. 21, 2023

(51) Int. Cl.
*H04L 45/28* (2022.01)
*H04L 41/16* (2022.01)
*H04L 43/0829* (2022.01)

(52) U.S. Cl.
CPC .............. *H04L 45/28* (2013.01); *H04L 41/16* (2013.01); *H04L 43/0835* (2013.01)

(58) Field of Classification Search
CPC ...... H04L 45/28; H04L 41/16; H04L 43/0835
See application file for complete search history.

(56) References Cited

U.S. PATENT DOCUMENTS

| | | | | |
|---|---|---|---|---|
| 10,033,602 B1* | 7/2018 | Russell | ..................... | H04L 43/20 |
| 11,088,937 B1* | 8/2021 | Zhou | ....................... | H04L 45/28 |
| 11,228,651 B2* | 1/2022 | Warnicke | ............ | H04L 41/5051 |
| 2015/0195190 A1* | 7/2015 | Shah Heydari | ......... | H04L 45/22 |
| | | | | 714/47.3 |
| 2016/0057061 A1* | 2/2016 | Avci | ........................ | H04L 43/50 |
| | | | | 370/235 |
| 2016/0087894 A1* | 3/2016 | Chen | ....................... | H04L 47/12 |
| | | | | 370/237 |
| 2016/0254991 A1* | 9/2016 | Eckert | ..................... | H04L 45/16 |
| | | | | 370/225 |
| 2017/0019312 A1* | 1/2017 | Meyer | ..................... | G06N 5/025 |
| 2017/0054619 A1* | 2/2017 | Kim | ....................... | H04L 43/028 |

(Continued)

OTHER PUBLICATIONS

N. Zilberman, P. M. Watts, C. Rotsos and A. W. Moore, "Reconfigurable Network Systems and Software-Defined Networking," in Proceedings of the IEEE, vol. 103, No. 7, pp. 1102-1124, Jul. 2015, doi: 10.1109/JPROC.2015.2435732. (Year: 2015).*

(Continued)

*Primary Examiner* — Patrice L Winder
(74) *Attorney, Agent, or Firm* — Guntin & Gust, PLC; Mark Wilinski

(57) ABSTRACT

A method includes capturing traffic at a source domain and a destination domain, creating a first traffic digest comprising unique packet identifiers representing traffic captured at the source domain, creating a second traffic digest comprising unique packet identifiers representing traffic captured at the destination domain, comparing the first traffic digest to the second traffic digest, if a loss is detected based on the comparing step, identify an alternative path between the source domain and the destination domain, switching processing to the alternative path, and resynchronizing traffic between the source domain and the destination domain on the alternative path.

20 Claims, 18 Drawing Sheets

(56) References Cited

U.S. PATENT DOCUMENTS

| | | | |
|---|---|---|---|
| 2018/0013556 A1* | 1/2018 | Saavedra | H04L 67/12 |
| 2019/0260657 A1* | 8/2019 | Filsfils | H04L 41/5009 |
| 2019/0280927 A1* | 9/2019 | Filsfils | H04L 45/24 |
| 2019/0350023 A1* | 11/2019 | Novlan | H04L 5/16 |

OTHER PUBLICATIONS

D. Sanvito, A. Marchini, I. Filippini and A. Capone, "CEDRO: an in-switch elephant flows rescheduling scheme for data-centers," 2020 6th IEEE Conference on Network Softwarization (NetSoft), Ghent, Belgium, 2020, pp. 368-376. (Year: 2020).*

* cited by examiner

SYSTEM AND METHOD FOR ANALYTICS BACKED SOFTWARE DEFINED NETWORK FAILURE DETECTION AND SYNCHRONIZATION

TECHNICAL FIELD

This disclosure is directed to systems and methods for quantum and analytics backed software defined network (SDN) based failure detection and synchronization.

BACKGROUND

Packet losses are common in data center networks and have severe impacts on application performance and network operations. In data centers, there exists some monitoring tools. Some of those tools may be used for detecting packet losses. However, the existing monitoring tools are generic and, while attempting to capture all types of network events, those tools often fall short in capturing losses quickly and with enough detail while maintaining low overhead. Also, there is no current efficient solution that detects the loss and at the same time provides a fast and safe recovery using alternate paths.

When dealing with node or link failures in a software defined network (SDN), the network's capability to establish an alternative path may depend in part or in whole on several factors, the accessibility of a controller and on the round-trip data transport times between the controller and the nodes or switches that may be involved in a node or link failure. Moreover, current SDN data plane abstractions for failure detection, such as OpenFlow "Fast-failover," do not allow programmers to tweak switch detection mechanisms, thus SDN operators must rely on whatever proprietary management interfaces and tools which may be available to achieve maximize detection and minimize recovery delays.

Thus, there is a need for a centrally monitored, fast and cost-effective failure detection, recovery and data resynchronization system and method.

SUMMARY

The present disclosure is directed to a method including capturing traffic at a source domain and a destination domain, creating a first traffic digest including unique packet identifiers representing traffic captured at the source domain, creating a second traffic digest including unique packet identifiers representing traffic captured at the destination domain, comparing the first traffic digest to the second traffic digest, if a loss is detected based on the comparing step, identifying an alternative path between the source domain and the destination domain, switching processing to the alternative path, and resynchronizing traffic between the source domain and the destination domain on the alternative path. The capturing and creating step may be performed by a traffic digest agent. The method may further include establishing policies relating to the identifying and switching steps wherein the policies are generated using machine learning algorithms. In an aspect, the comparing step may be performed using a flow conservation rule. In an aspect, identical entries in the first traffic digest and the second traffic digest may be eliminated from a digest controller as part of the comparing step and wherein only the remaining entries after the identical entries are eliminated are used in the identifying and switching steps.

The present disclosure is also directed to a system including a digest controller, a plurality of traffic digest agents in communication with the digest controller, wherein each traffic digest agent is configured to capture upstream traffic data and downstream traffic data and to forward identifying information of the upstream traffic data and the downstream traffic data to the digest controller, and a software defined network in communication with the digest controller, wherein the software defined network is configured as a network cloud having one or more of servers, and wherein the ono or more servers has an input-output interface, a processor coupled to the input-output interface wherein the processor is further coupled to a memory, the memory having stored thereon executable instructions that when executed by the processor cause the processor to effectuate operations including receiving comparison data from the digest controller, wherein the comparison data identifies data losses in the software defined network between a first traffic digest agent and a second traffic digest agent, instructing the first traffic digest and the second traffic digest agent to cause their respective nodes to resynchronize data transfer therebetween, if resynchronization does not occur, then instructing the first traffic digest agent and a second traffic digest agent to use an alternative communication path, and instructing the first traffic digest agent and second traffic digest agent to cause their respective nodes to resynchronize data transfer using the alternative communication path. In an aspect, the digest controller may be configured to compare the identifying information of the upstream traffic data and the downstream traffic data using a flow conversation rule, eliminating duplicate identifying information, and sending remaining identifying information to the software defined network. In an aspect, the alternative communication path is based on a policy associated with the software defined network and wherein the policy may be updated based on using the alternative path. The alternative path may use a satellite node configured to communicate between the respective nodes of the first traffic digest agent and the second digest agent.

The system may further include an analytics module configured to receive the identifying information of the upstream traffic data and the downstream traffic data from the digest controller, compare the identifying information of the upstream traffic data and the downstream traffic data, eliminating duplicate identifying information, and sending remaining identifying information to the software defined network, wherein the analytics module is further configured to dynamically determine a policy and wherein alternative paths utilized by the software defined network and end-to-end network usage statistics are used to update the policy. In an aspect, the updated policy is determined using a machine learning algorithm. The system may further include a quantum module associated with a plurality of nodes in the system, wherein the quantum module is configured to provide enhanced speed of data and control flow between the plurality of nodes.

The disclosure is also directed to a system, including a plurality of traffic digest agents, each traffic digest agent configured to capture data transferred to and from a node and to create unique identifiers associated with the captured data, a digest controller in communication with the plurality of traffic digest agents and configured to receive to receive the unique identifiers associated with the captured data, compare the unique identifiers and eliminate duplicate captured data based on the comparison of the unique identifiers to identify lost data packets, and transmitting remaining unique identifiers to a controller in a software defined network, wherein the controller is configured to instruct each node associated with the lost data packets to use an alternative communications path to resynchronize the data transfer between the each node associated with the lost data packets. In an aspect, the alternative path is chosen according to a policy, and the system may further include an analytics module in communication with the digest controller and configured to determine the policy using a machine learning algorithm. The system may further include a quantum module associated with each node; the quantum module configured to provide security to transmission paths between the each nodes.

This summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

Reference will now be made to the accompanying drawings, which are not necessarily drawn to scale.

DETAILED DESCRIPTION OF ILLUSTRATIVE EMBODIMENTS

Acronyms Used in this Specification

Figure 1A:
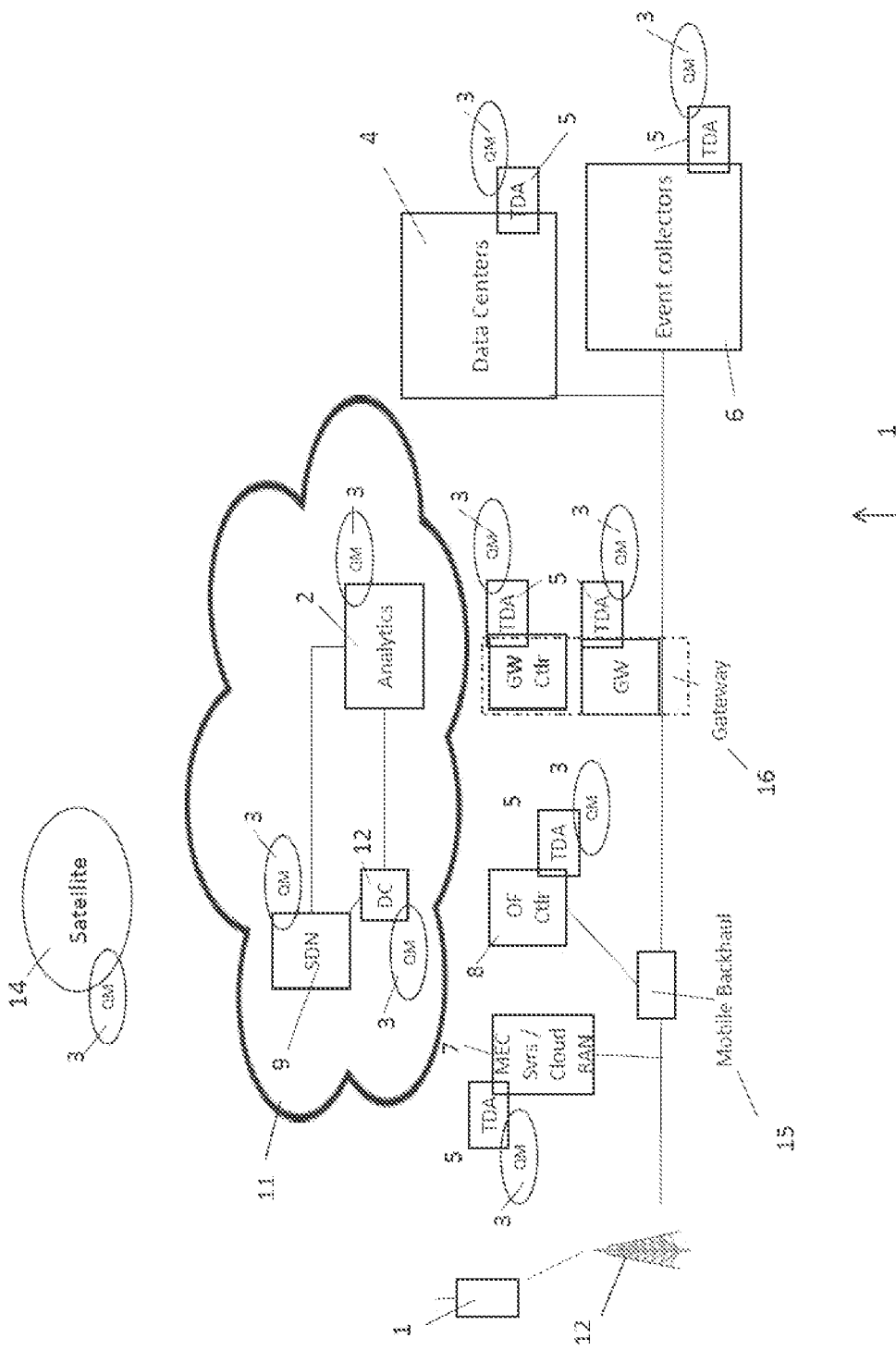
FIG. 1a illustrates an exemplary operating environment of the present disclosure without all interconnections of the various components explicitly shown.

Unless otherwise specified herein, the acronyms used in this specification and accompanying drawings shall have the meaning set forth below:

PNF—Physical Network Function
DC—Digest Collector
GW—Gateway
MEC—Multi-access edge computing
QSA—Quantum and Analytics
QM—Quantum Module
SDN—Software Defined Network
TDA—Traffic Digest Agent
VNF—Virtual Network Function System Overview. This disclosure is directed to a novel system and method for automatically troubleshooting network cloud problems including physical network function (PNF)/fabric failure, virtual network function (VNF) malfunction, software misconfiguration, and failed points of deployment As such, the disclosure provides a practical application to solve a problem and advance the state of the telecommunications art.

The present disclosure captures both the locations and packet header information of any lost packets to assist in diagnosing and mitigating packet losses by leveraging data analytics. The disclosure provides a system and method that is not only specific to loss detection but also specific to Quantum and Analytics ("QSA") enabled fast disaster recovery given the prevalence and importance of packet losses in data centers/nodes. The system provides a network-wide new dynamic loss detection solution that captures all types of losses which may happen anywhere or at any time, specifically being able to identify individual lost packets while keeping processing overhead low. Although the number of packets in the network is too large for a local agent such as a traffic digest agent (TDA) to track, the number of lost packets is much smaller. The disclosure provides a system and method whereby only lost packets are tracked to reduce the processing overhead.

The solution follows the QSA-enabled flow conservation rule which states that the set of packets that comes into any quantum-enabled or non-quantum enabled network domain, including, for example, a link, a switch module, a switch, or an area of network devices, should be equal to the set of packets that leaves that domain, as long as that domain does not include any packet sources and sinks. In the case of the present disclosure, quantum capability may provide additional speed and security in this QSA-enabled disaster recovery. Using flow conservation rules to detect data loss is novel and nonobvious in the dynamic QSA-enabled environment.

The present disclosure may also include a central control policy-based flexibility built into the solution. Based on the pre-defined and/or dynamically adopted policies, the SDN may interface with a local agent, such as a traffic digest agent ("TDA"), via a central module, such as a digest controller ("DC"), and using out of band signaling, such as a satellite communications link, to implement recommended action in the nodes, including servers, gateways and databases. The disclosure provides user-defined, policy-based QSA supported failure detection and fast and safe recovery.

The system and method of the present disclosure tracks traffic digests created at a source (upstream) TDA and a destination (downstream) TDA. Comparing the traffic digest at those two TDAs, identical packets within each digest will cancel out, so only the packets that appear at the upstream TDA and do not appear at the downstream digest, namely the lost packets, remain as a result of the comparison. This may permit the digest size to be smaller as it only needs to be large enough to accommodate the number of losses, not the total number of packets. This system and method of the present disclosure may leverage the use of traffic digests by using technology such as Invertible Bloom Filtering ("IBF"). See, for example, D. Eppstein, et. al., *What's the Difference? Efficient Set Reconciliation without Prior Context*, SigCOMM'11, August 15-19, Toronto, Ontario Canada, which is hereby incorporated by reference in its entirety for the teachings contained therein.

Operating Environment. The system and method provided herein allows for the automatic detection of data losses and corrections or work arounds relating thereto. While the description will be directed to wireless networks, it will be understood that the concepts described herein may also be applied to information technology infrastructure.

With reference to FIG. 1a, there is shown an exemplary network architecture 10 of a quantum and analytics enabled SDN-based fast failure detection, loss recovery and data resynchronization system in accordance with the present disclosure. The architecture 1 includes a network cloud 11 comprising generic servers shown as bare metal servers 12 on which a software defined network may be instantiated. The disclosure is applicable to any type of software defined network 11 implemented in a cloud environment, including but not limited to any type of wireless communication network, including 3G, fourth generation (4G)/LTE, fifth generation (5G), and any other wireless communication network. It will be understood by those skilled in the art that while the network 11 may comprise the afore-mentioned networks, a combination of one or more communication networks may be used. Within the network cloud 11, there is shown, inter alia, a software defined network (SDN) 9. An exemplary detailed description of a software define network is set forth below with reference to FIGS. 8-16.

In FIG. 1a, not all communication paths between components or nodes are shown. However, some of those communication paths are highlighted in subsequent FIGS. 2-5. Note that unless specifically set forth in this written description, the terms components and nodes will be used interchangeably herein. It will be understood that the various components shown in system architecture 1 may be in direct or indirect communication with other components of system architecture 1 as is known by those skilled in the art in 3G, 4G, LTE, and 5G systems.

The network cloud 11 interfaces with the other network components as known in the art. Shown as exemplary network components including cellular towers 12, mobile backhaul transport 15 comprising, for example mobile edge computing (MEC) servers and a cloud-based radio access network (RAN) 7, and one or more gateways and gateway controllers 16. MEC servers and could RAN 7 may enable content providers and software developers to use cloud computing capabilities that are close to the end users. MEC servers and cloud-based RAN 7 may be designed to provide ultra-low latency and high bandwidth to enable new applications and business use cases using network 11.

The architecture 1 also includes other functional components which are new and non-obvious additions to a network systems architecture such as data collectors (DC) 12, traffic digest agents (TDA) 5, quantum modules (QM) 3, and an analytics module 2. There is also shown a satellite node 14 which can be used as part of network 11.

Network device(s) 1 may communicate through cell towers 12 and clouded-based radio access networks and mobile edge computing servers (collectively shown as 7) to communicate using network cloud 11. Device data is transmitted through the mobile backhaul system 15 under the control of one or more controllers 8 through gateway system 16. Gateway system 16 may include gateways and gateway controllers to provide communication services between the network device(s) 1 and the SDN 9.

Figure 1B:
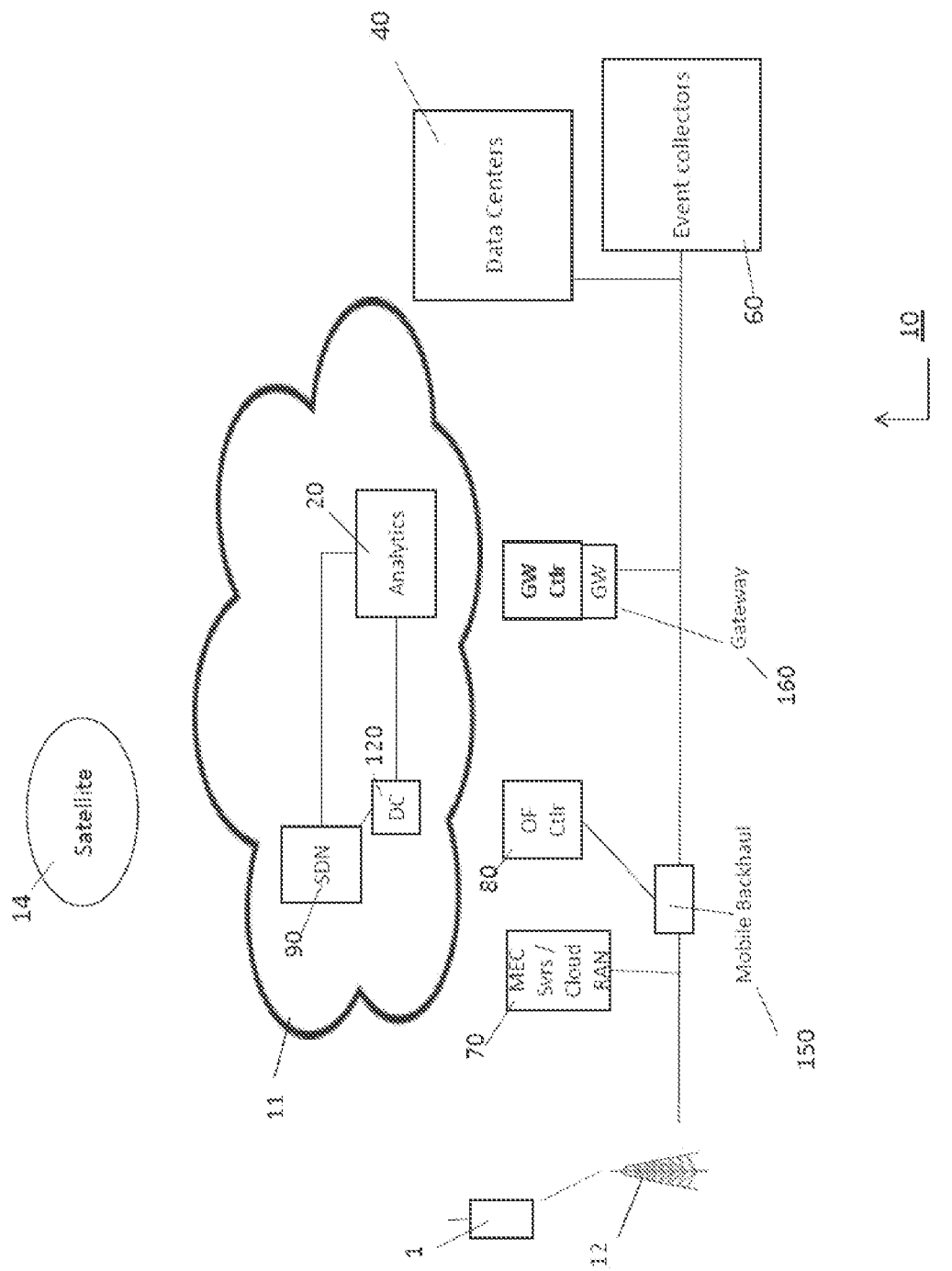
FIG. 1b illustrates a simplified view of the operating environment of FIG. 1 with the QM and TDA functions integral to the nodes.

It will be understood that the TDAs and QMs shown in FIG. 1a may be integral to the various components or distinct from but associated with the various components. FIG. 1b illustrates the network architecture 10 which is similarly configured as network architecture 1 in FIG. 1a except that the nodes have their associated TDAs and QMs integral and not explicitly shown. For example, MEC servers 70 in FIG. 1b include an integral TDA and QM and not shown in FIG. 2. Likewise, OF controller(s) 80, gateway(s) 160, event collectors 60, data centers 50, digest controller 120 and analytics module 20 have their associated TDAs and QMs integral thereto and are not explicitly shown in FIG. 1b. Likewise similar components in FIGS. 2a-5 have the associated TDAs and QMs integral thereto and are not explicitly shown in those figures. FIGS. 2a-5 and the associated written description should be read to include either integral TDAs and QMs or distinct but associated TDAs and QMs.

Figure 2:
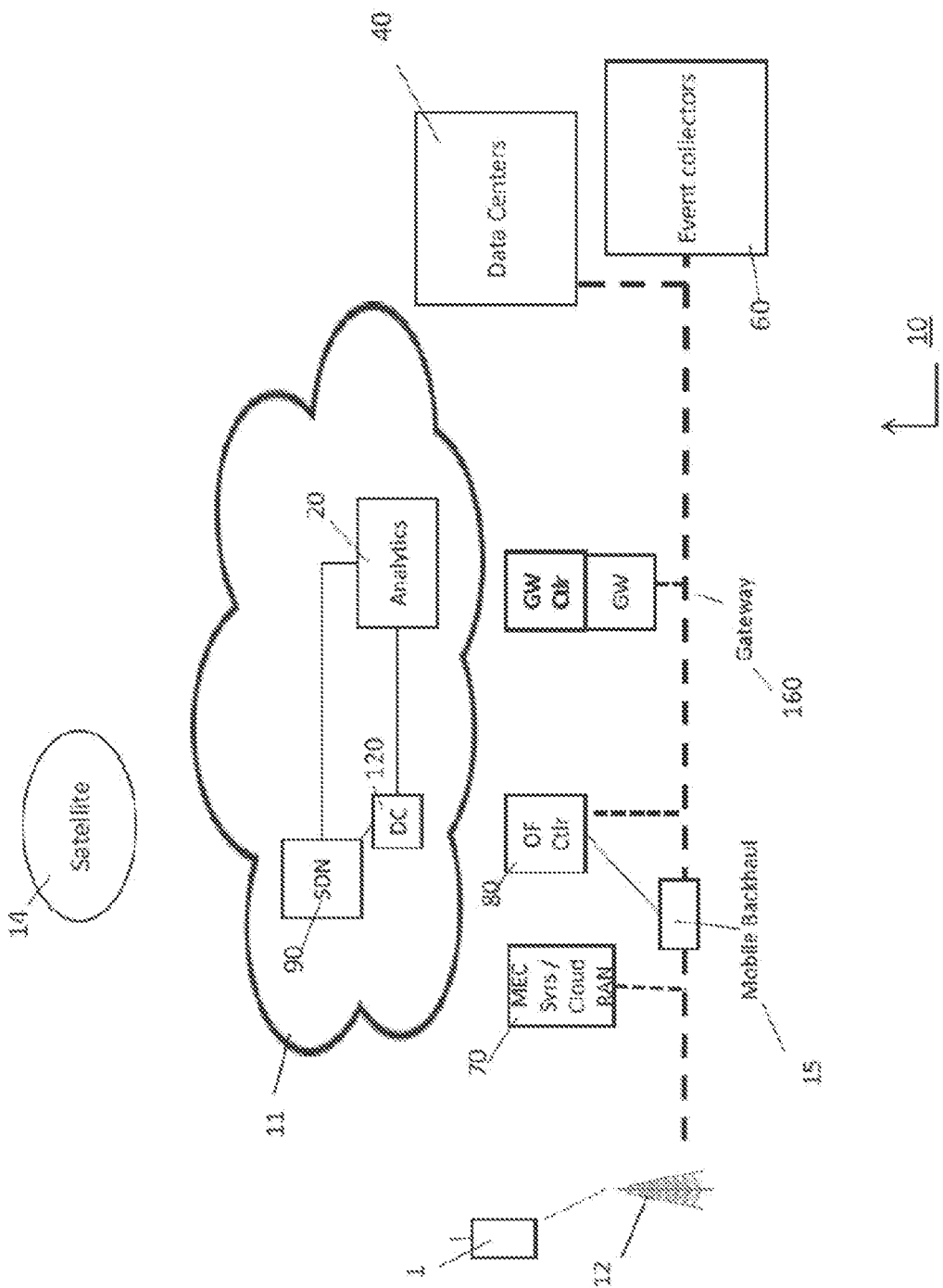
FIG. 2 illustrates the operating environment of FIG. 1b highlighting the control signaling for SDN functions.

Communication Paths. Exemplary communication paths among the various components are shown in FIGS. 2-5. FIG. 2 shows exemplary control signaling for SDN-based functions (shown as dashed line) which includes signaling between tower 12, MEC servers and cloud RAN 70, OF controllers 80, gateway controllers 160, event collectors 60 and data centers 40. It will also be apparent to those skilled in the art that there is control signaling to and from the SDN 9 and other parts of the cloud network 11 which is not shown in FIG. 2.

Figure 3:
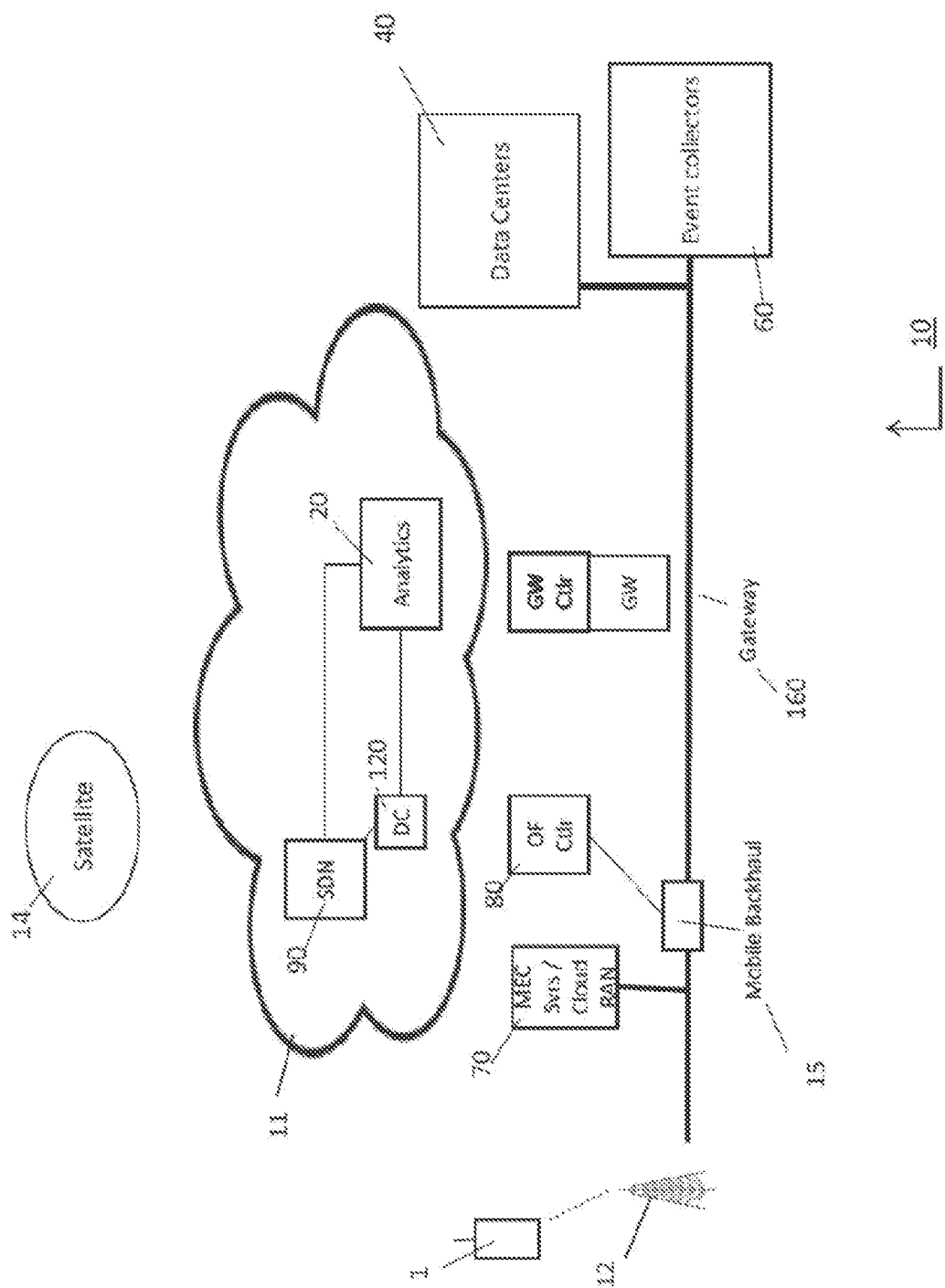
FIG. 3 illustrates the operating environment of FIG. 1b highlighting the data flow functionality.

FIG. 3 illustrates an exemplary data communications path shown in solid lines which includes data flow between the tower 12, MEC servers and cloud-based RAN 70, event collectors 60, and data centers 40. It will also be apparent to those skilled in the art that there will be data flow to and from the SDN 9 and other parts of the cloud network 11 which is not shown in FIG. 3.

Figure 4:
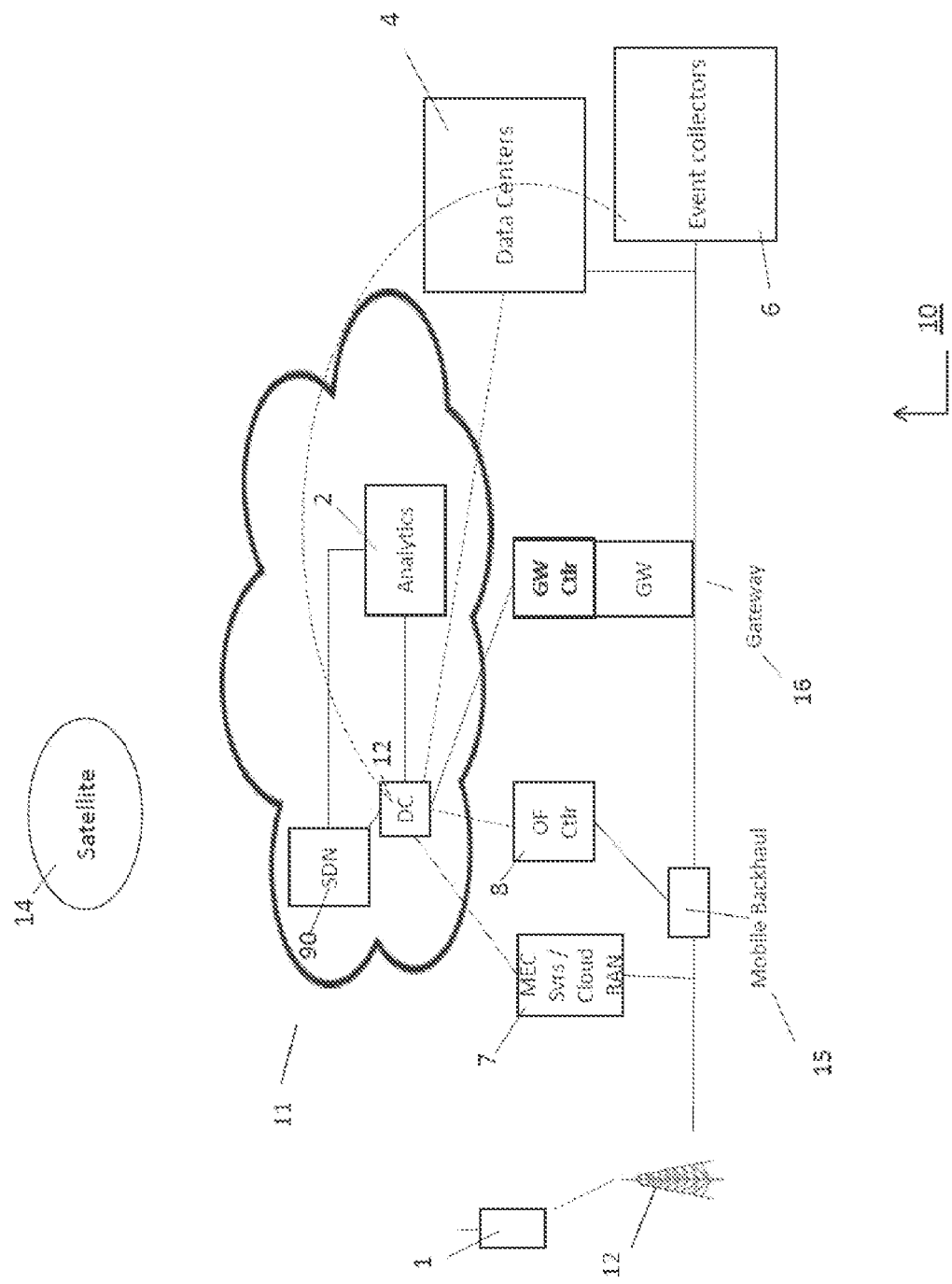
FIG. 4 illustrates the operating environment of FIG. 1b highlighting the data migration functionality.

FIG. 4 illustrates exemplary data migration paths shown in dashed lines. Data migration paths, in this example, may include communication paths among the various components such as MEC servers and cloud-based RAN 70, OF controllers 80, gateways 160 event collectors 60, and data centers 40 through digest controller 120. These data migration paths permit data migration from any data center 40 to any servers or other nodes and vice versa.

Figure 5:
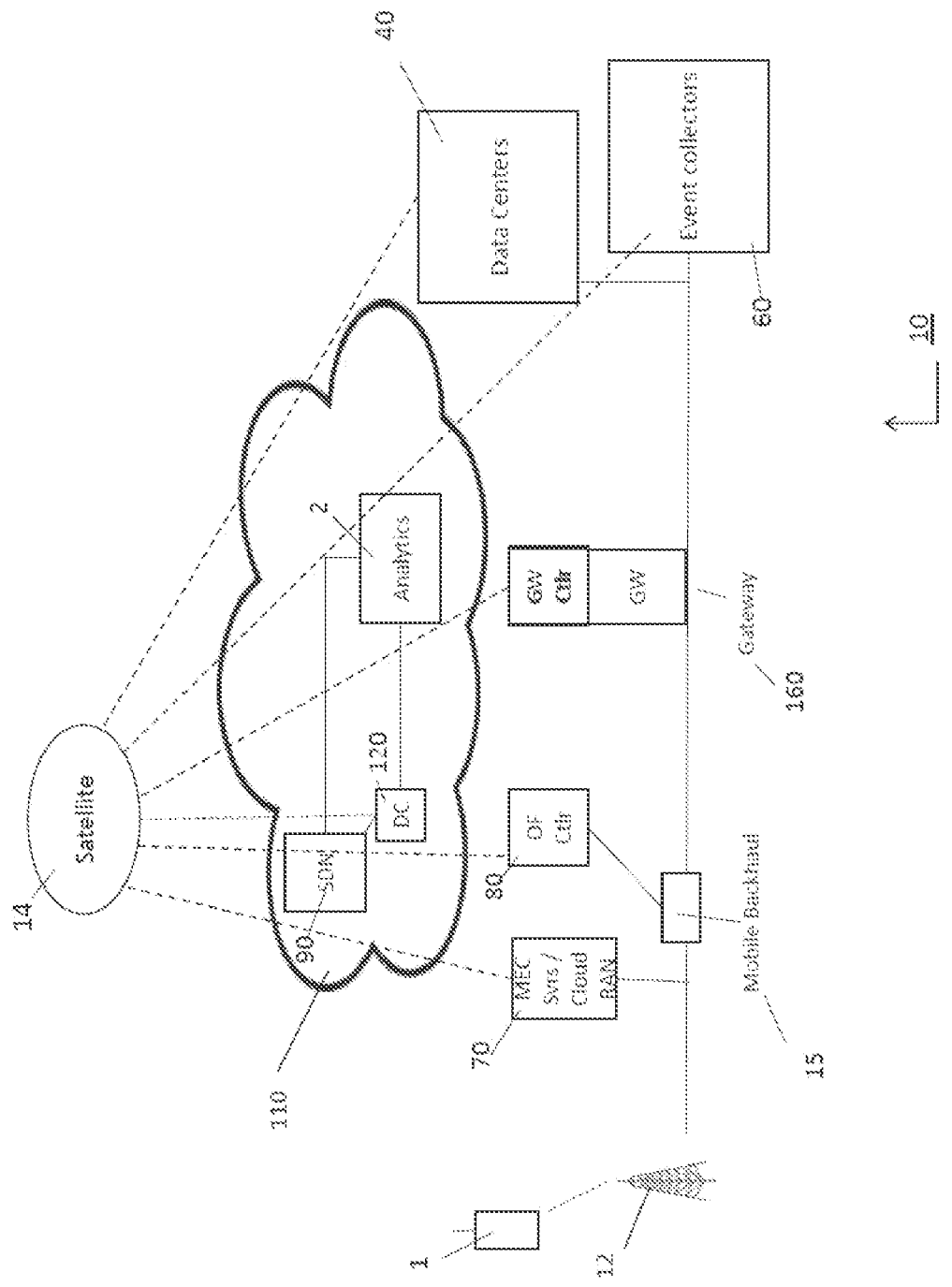
FIG. 5 illustrates the operating environment of FIG. 1b highlighting the data flow between TDAs and the DC and satellite.

FIG. 5 illustrates an exemplary data communications path shown in dashed lines between the satellite 14 and the TDAs integral to MEC servers and cloud-based RAN 70, gateways and gateway controllers 160, event collectors 60, data centers 40 and digest controllers 120. These data communication paths may be used to reconfigure the network 110 and any of the other components or nodes upon detection of a failure due to lost data packets. An example of such reconfiguration will be described below in relation to FIG. 7

Quantum Modules. As shown in FIG. 1a, a unique feature in the present disclosure within the proposed architecture 10 includes that each of the above-identified components may be equipped with a Quantum Module (QM) 3 operating in conjunction with each component. Each of the QMs 3 provides secure and fast communication among the various component and nodes in the architecture 10. It is noted that while quantum computing modules may provide enhanced speed and security, the system and method of the present disclosure may be implemented without such QMs 3.

Traffic Digest Agents. There is shown in FIG. 1a multiple TDAs 5. In an aspect, there may be local TDAs 5 at individual or regional data centers 4 center to capture unidirectional traffic after it leaves a source (upstream) domain and before it enters a destination (downstream) domain in the network. Each TDA 5 encodes the unique identifiers for individual packets into a traffic digest via the TDA 5, and periodically reports traffic digests to a central digest controller (DC) 12. TDA(s) 5 may communicate with each other through the digest controller 12 to record identifiers of data transfer between nodes of the architecture 10 and as illustrated in FIG. 4. Additionally, each TDA 5 may have a data communication path to satellite node 14 as illustrated in FIG. 5.

Digest Controller. Also shown as residing in the core cloud network 11 of FIG. 1a is a digest controller (DC) 12. The DC 12 interfaces with SDN 9 and Analytics module 2. Either the DC 12 or the analytics module 2 may compare the respective upstream and downstream TDA digest reports, wherein the same packets at both digests cancel out, so only the packets that do not appear at the downstream (i.e., lost packets) remain in the result. The DC 12 may then periodically report these results to the SDN 9.

Analytics Module. Analytics module 2 captures and monitors the end-to-end usage and other statistics of network cloud 11, including satellite 14 health statistics. The analytics module 2 periodically or in real-time, may ingest the digest reports from the DC 12. The analytics module 2 may analyze the traffic digests and compare the traffic digests from upstream and downstream digests to detects anomalies. Such anomalies would be detected as violations of the flow conservation rule, based on the inputs received from the DC 12 and then reported to the SDN 9 detailing information of lost packets.

Date Centers. FIG. 1a also shows data center(s) 4 which may be local or regional in nature. Each of the data center(s) 4 may be in communication with digest controller 12 and through the digest controller 12, data center(s) 4 may be in communication with other data centers and with any other server in the architecture 10. Such a communication path is shown in dashed lines in FIG. 4. This configuration permits data migration from any data center(s) 4 to any server and vice-versa. Upstream and downstream TDAs 5 located at each server node are available to record the data identifiers associated with such data migration.

Event Collectors. Event collector(s) 6 may be used in the architecture 10 to record anomalies detected by the DC 12 or analytics module 2, along with any corrective action taken in response to the detection of anomalies. The event collector(s) 6 may periodically feed back data associated with such anomalies to the analytics module to continue the refinement of machine-learning algorithms used to develop polices for the network cloud 11.

Satellite Nodes. Each of the components in architecture 10 may include a standby interface providing a communication path to the satellite node 14 that provides fast and secure connection among the components. Satellite node 14 may be brough online on demand for off-loading network congestion and especially during disaster recovery as the satellite node 14 may be accessed by alternative paths as determined by the policies and the analytics module 2.

Methods of Use. As an overview, TDAs 5 capture unidirectional upstream and downstream and create traffic digests based on the captured data. Each TDA 5 encodes the unique identifiers for individual packets into a traffic digest, and periodically reports traffic digests to the DC 12 in a core network that in turn provides feedback to the SDN 9 and analytics module 2. The analytics module 2 periodically or in real-time, ingests the digest reports from the DC 12 and analyzes and compares traffic digests from upstream and downstream digests and detects anomalies, namely the violations of the flow conservation rule, based on the input from the DC 12 and reports detailed information of lost packets to the SDN 9. DC 12 or analytics module 2 may compare the two TDAs' digest reports, where the same packets at both digests cancel out, so only the packets that do not appear at the downstream (i.e., lost packets) remain in the result.

Upon detection of any packet loss, the SDN 9 may instruct the DC 12 to perform re-synchronization between the sending and receiving nodes via their respective TDAs 5. Note that if the normal path between the sending and receiving nodes for the data re-synchronization is tampered with, damaged, or not otherwise available, one or more alternate path(s) will be determined, if any, and that one of the one or more alternative paths may be invoked at the instruction of the SDN 9 based on pre-built logic or policies.

The SDN 9 may refresh its logic or policy tables using machine learning analytics in the analytics module 2 whereby the analytics module 2 provides the SDN 9 with the updated policies based on its machine learning algorithms and prediction tools, The analytics module may receive data from both the end-to-end users as well as control data flows and other health statistics available in the entire network architecture 1. The polices may consider the cloud network 11 capability to establish an alternative path that depends on controller reachability and on the round-trip times RTTs between controllers and involved nodes/switches. The policies may include, for example, the identification of likely problem areas and preferred alternative paths between source domains and destination domains. The policies may also include a ranking of such alternative paths based on factors such as network efficiency, latency and loading. The policies may be based on time of day, location, traffic patterns, the number of users at a particular edge, the computational load on the network, and other factors.

Figure 6A:
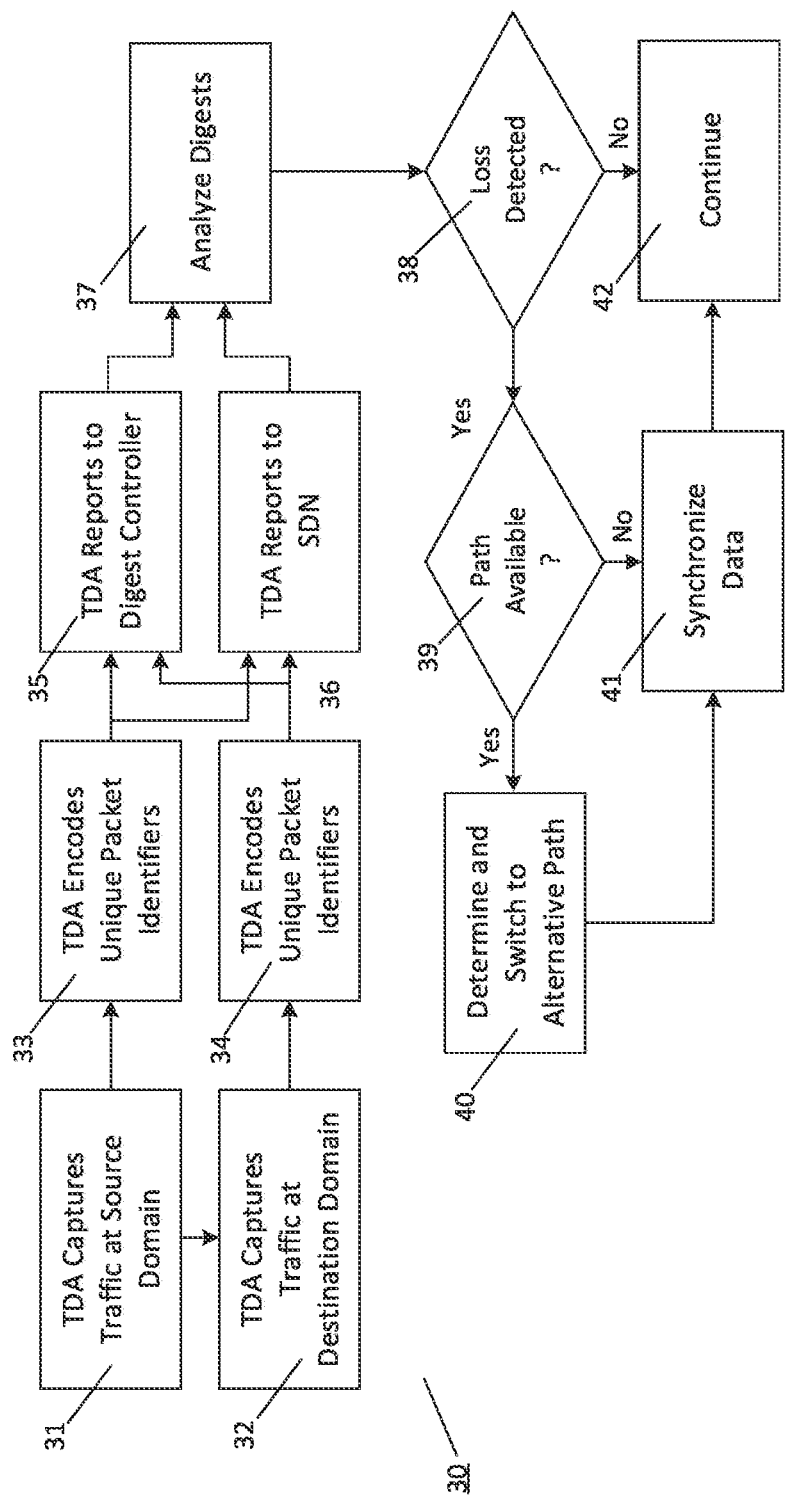
FIG. 6a illustrates an exemplary flowchart of a method in accordance with the present disclosure.
Figure 6B:
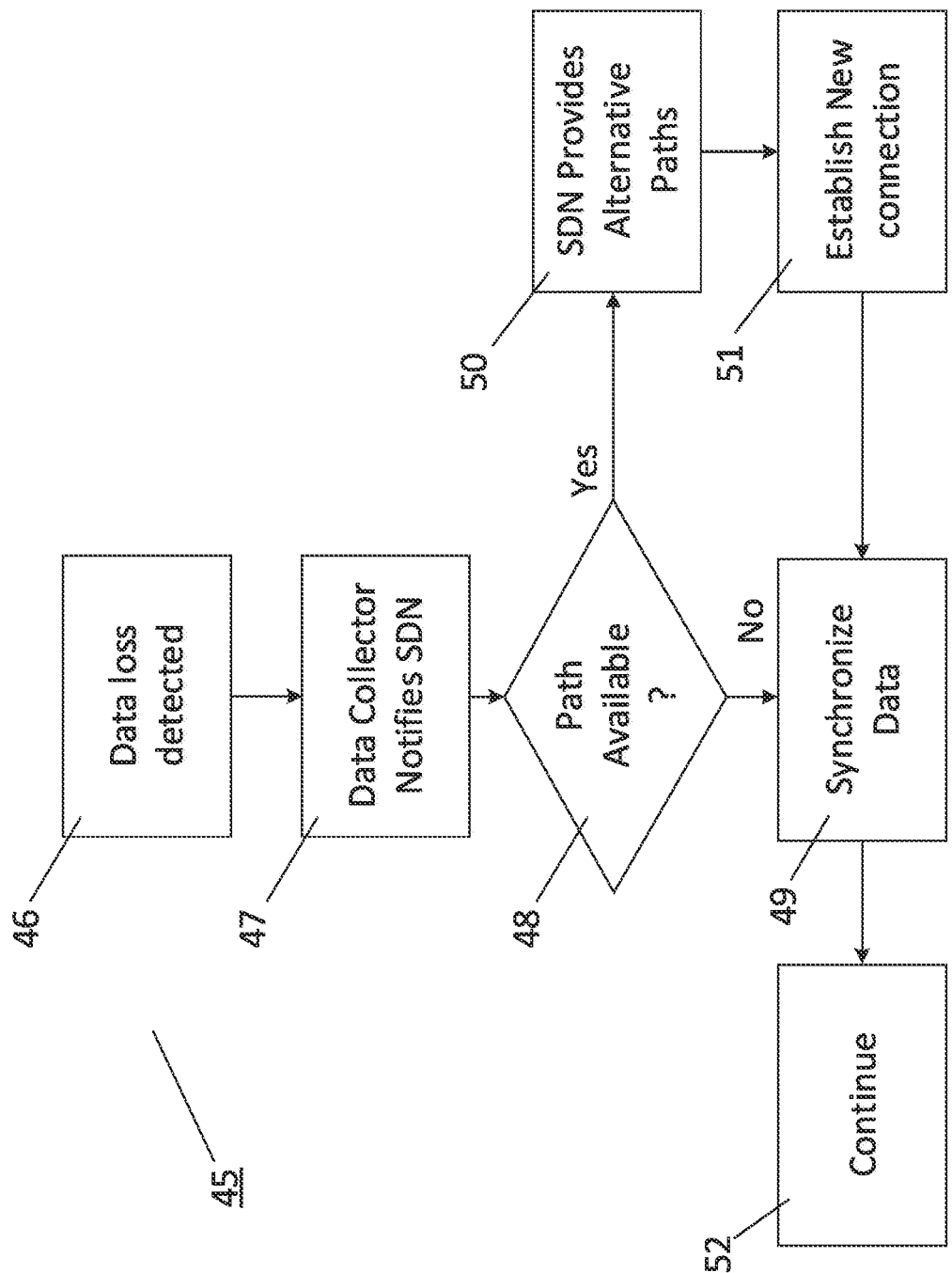
FIG. 6b illustrates an exemplary flowchart of a second method in accordance with the present disclosure.

FIGS. 6a and 6b show exemplary methods of use in accordance with the present disclosure. With reference to FIG. 6a, there is shown method 30. At 31 and 32, the TDAs capture traffic at the source domain and destination domain, respectively. At 33, the TDA that captured traffic at the source domain encodes unique packet identifiers. AT 34, the TDA that captured traffic at the destination domain encodes unique packet identifiers. At 35, the respective TDAs report the unique packet identifiers to the digest controller and in parallel at 36, the respective TDAs report the unique packet identifiers to the SDN. At 37, the analysis module 20 analyzes the digests. At 38, a determination is made whether a loss was detected. If no loss was detected, the process continues at 42. If there is a loss detected at 38, the process continues at 39 to see if an alternative path is available. If no alternative path is available, data is synchronized to the extent the network is able to do using the current path at 41 If there is an alternative path available, then that alternative path is determined and then the processing is switched to the alternative path at 40. Data is synchronized at 41 and the process continues at 42.

With respect to FIG. 6b, there is shown an exemplary method 45. At 46 data loss is detected. At 47, the data collector notifies the SDN. At 48, a determination is made as to whether an alternative path is available. If there is no alternative path available, the data is synchronized at 49 to the extent the network is able to do so using the current path. If there is an alternative path available at 48, the SDN provides the alternative path at 50. At 51, new connections are established at 51 and data is synchronized at 49. The process continues at 52.

Figure 7:
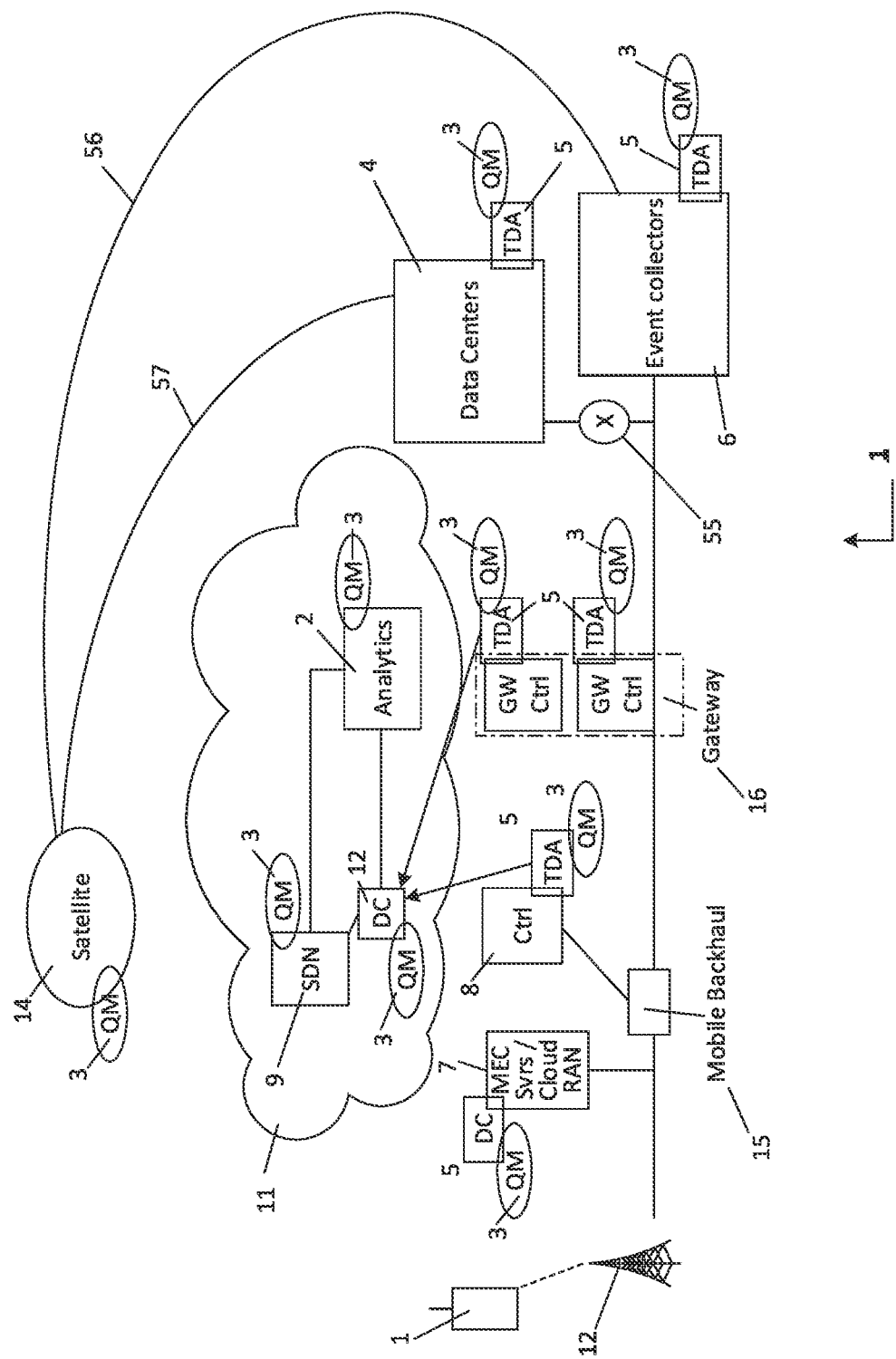
FIG. 7 illustrates the operating environment of FIG. 1a highlighting the recovery of a fault located between the event collector and data centers.

Sample Use Case. With reference to FIG. 7, there is shown an example use case in which data loss is detected between nodes. Exemplary messaging for the solution architecture may be represented by the following process.

Data connectivity loss occurs at location X 55 between data center(s) 4 and event collector(s) 6.

Data loss is detected by the DC 12 or analytics module 2 based on the respective TDAs 5 reporting of packet identifiers.

The DC 12 notifies the SDN 9 of the data loss and initiates data resynchronization.

If it determined that the normal data path between data center(s) 4 and event collector(s) 6 is not available, SDN 9 may provide a list of alternate paths to the DC 12, including a path that includes satellite node 14.

The DC 12 may, in turn, then instruct the respective QMs 3 and TDAs 5 in the data center(s) 4 and event collector(s) 6 (and elsewhere in the network cloud 11 or the mobile backhaul 15) to setup the alternative connection via the satellite node 14 by using an alternative data path represented by data paths 56 57. Any other alternative path that may available independent of the satellite node 14 may also be specified by the SDN 9.

The SDN 9 may then refresh its logic or policy tables by leveraging the machine learning analytics. The analytics module 2 may constantly monitor and update the policy tables.

After the alternative data connection path is established, the data center(s) 4 and event collector(s) 6 may then resynchronize the data.

As set forth above, the disclosed systems and methods may include the use of the artificial intelligence or machine learning algorithms in the analytics module 2. For example, the logic and policy rules of the event collector or digest controller algorithms may be programed and then initially trained with a data set and once operational, the algorithms may continually become more efficient and accurate as the algorithm processes additional data sets. The algorithms may be any type of suitable machine learning algorithm such as linear or multivariable regression analytics. Because the systems operate in a cloud environment and may use software defined networking, the systems are inherently scalable. For the purposes of this disclosure, artificial intelligence and machine learning are used interchangeably.

In view of the foregoing, the present disclosure provides a practical application and enhances the state of the technology for network cloud computing. The disclosure promotes zero-touch automation by isolating network cloud faults without human intervention, improves network cloud diagnosis mechanism with self-learning, self-growing, and self-serve capabilities, updates operations with real-time status upon a network outage or service interruption event, embeds a knowledge base into the network cloud platform, and increases network cloud assurance productivity with reduce maintenance cost.

There are several exemplary benefits realized from the systems and methods of the present disclosure. There may be overall improved quality of service, better failure detection and recovery capabilities, and improved network accuracy, reliability and maintainability.

Figure 8:
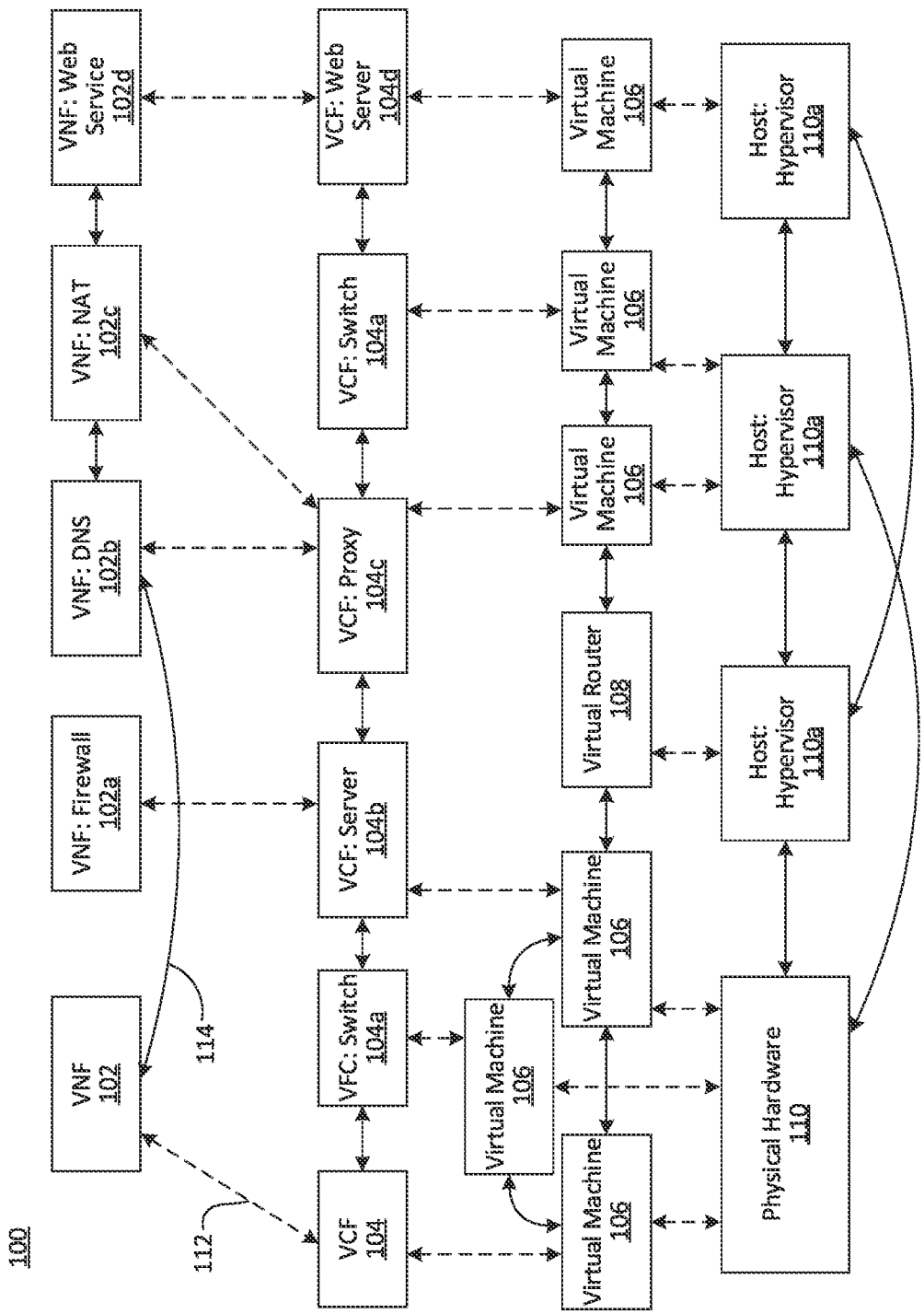
FIG. 8 is a representation of an exemplary software defined network.

Software Defined Network Detailed Description. FIG. 8 is a representation of an exemplary network 100. Network 100 may comprise a Software Defined Network (SDN)—that is, network 100 may include one or more virtualized functions implemented on general purpose hardware, such as in lieu of having dedicated hardware for every network function. That is, general purpose hardware of network 100 may be configured to run virtual network elements to support communication services, such as mobility services, including consumer services and enterprise services. These services may be provided or measured in sessions Virtual network functions (VNFs) 102 may be able to support a limited number of sessions. Each VNF 102 may have a VNF type that indicates its functionality or role. For example, FIG. 8 illustrates a gateway VNF 102a and a policy and charging rules function (PCRF) VNF 102b. Additionally or alternatively, VNFs 102 may include other types of VNFs. Each VNF 102 may use one or more virtual machines (VMs) 106 to operate. Each VM 106 may have a VM type that indicates its functionality or role. For example, FIG. 8 illustrates multiple VMs 106 that may include MCM VM, an ASM VM, and a DEP VM. Additionally, or alternatively, VMs 106 may include other types of VMs. Each VM 106 may consume various network resources from a server 112, such as a resource 108, a virtual central processing unit (vCPU) 108a, memory 108b, or a network interface card (NIC) 108c in FIG. 9. Additionally, or alternatively, server 112 may include other types of resources 108.

Figure 9:
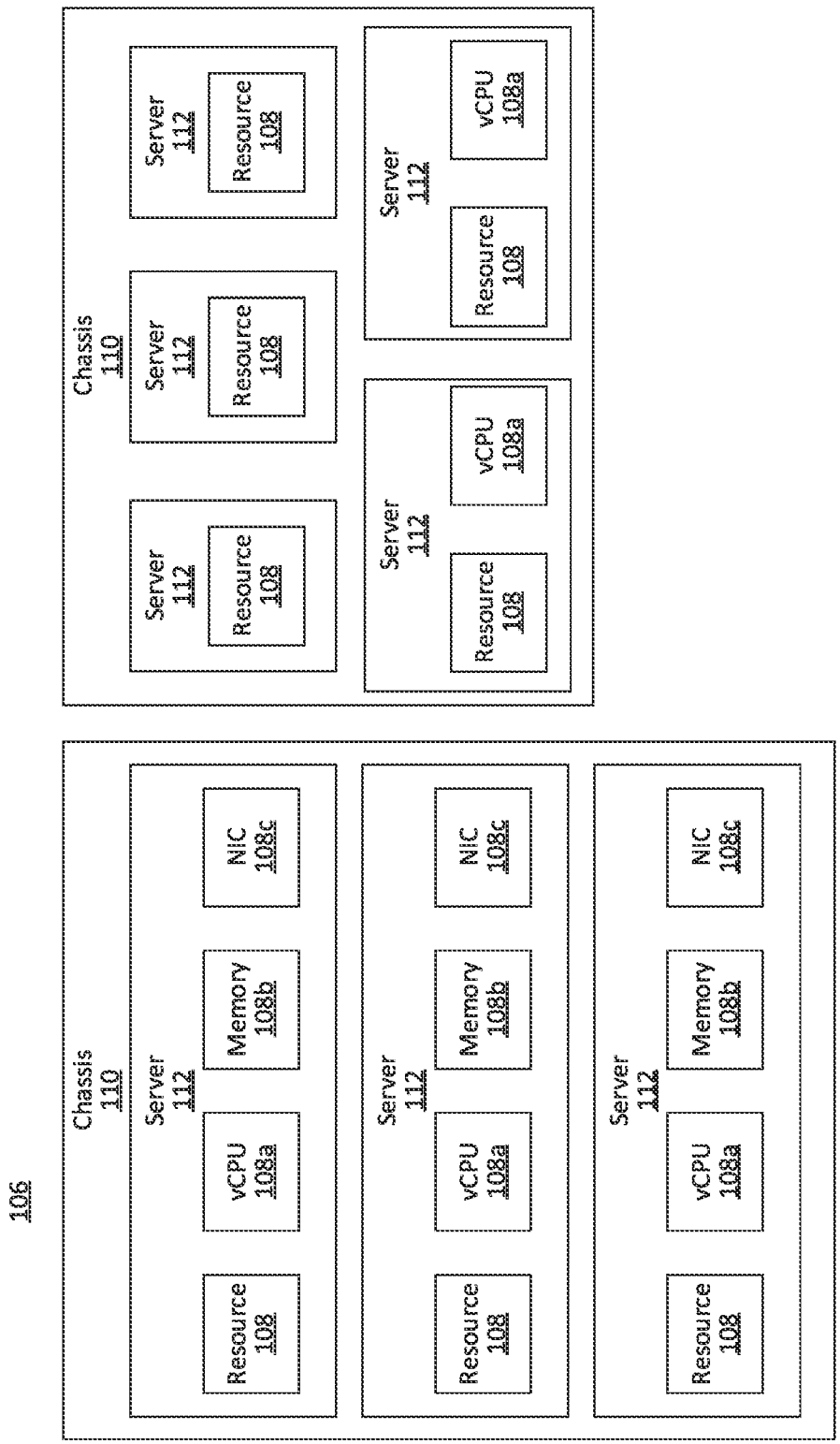
FIG. 9 is a representation of an exemplary hardware platform for a network.

While FIG. 8 illustrates resources collectively contained in hardware platform 911, the configuration of hardware platform 911 may isolate, for example, certain memory 108b from other memory 108b FIG. 9 provides an exemplary implementation of hardware platform 910.

Hardware platform 911 may comprise one or more chasses 110. Chassis 110 may refer to the physical housing or platform for multiple servers 112 or other network equipment. In an aspect, chassis 110 may also refer to the underlying network equipment. Chassis 110 may include one or more servers 112. Server 112 may comprise general purpose computer hardware or a computer. In an aspect, chassis 110 may comprise a metal rack, and servers 112 of chassis 110 may comprise blade servers that are physically mounted in or on chassis 110.

Each server 112 may include one or more network resources 108, as illustrated. Servers 112 may be communicatively coupled together (not shown) in any combination or arrangement. For example, all servers 112 within a given chassis 110 may be communicatively coupled. As another example, servers 112 in different chasses 110 may be communicatively coupled. Additionally, or alternatively, chasses 110 may be communicatively coupled together (not shown) in any combination or arrangement.

The characteristics of each chassis 110 and each server 112 may differ. For example, FIG. 9 illustrates that the number of servers 112 within two chasses 110 may vary. Additionally, or alternatively, the type or number of resources 108 within each server 112 may vary. In an aspect, chassis 110 may be used to group servers 112 with the same resource characteristics. In another aspect, servers 112 within the same chassis 110 may have different resource characteristics.

Given hardware platform 911, the number of sessions that may be instantiated may vary depending upon how efficiently resources 108 are assigned to different VMs 106. For example, assignment of VMs 106 to particular resources 108 may be constrained by one or more rules. For example, a first rule may require that resources 108 assigned to a particular VM 106 be on the same server 112 or set of servers 112. For example, if VM 106 uses eight vCPUs 108a, 1 GB of memory 108b, and 2 NICs 108c, the rules may require that all of these resources 108 be sourced from the same server 112. Additionally, or alternatively, VM 106 may require splitting resources 108 among multiple servers 112, but such splitting may need to conform with certain restrictions. For example, resources 108 for VM 106 may be able to be split between two servers 112. Default rules may apply. For example, a default rule may require that all resources 108 for a given VM 106 must come from the same server 112.

An affinity rule may restrict assignment of resources 108 for a particular VM 106 (or a particular type of VM 106). For example, an affinity rule may require that certain VMs 106 be instantiated on (that is, consume resources from) the same server 112 or chassis 110. For example, if VNF 102 uses six MCM VMs 106, an affinity rule may dictate that those six MCM VMs 106 be instantiated on the same server 112 (or chassis 110). As another example, if VNF 102 uses MCM VMs 106, ASM VMs 106, and a third type of VMs 106, an affinity rule may dictate that at least the MCM VMs 106 and the ASM VMs 1046 be instantiated on the same server 112 (or chassis 110). Affinity rules may restrict assignment of resources 108 based on the identity or type of resource 108, VNF 102, VM 106, chassis 110, server 112, or any combination thereof.

An anti-affinity rule may restrict assignment of resources 108 for a particular VM 106 (or a particular type of VM 106). In contrast to an affinity rule—which may require that certain VMs 106 be instantiated on the same server 112 or chassis 110—an anti-affinity rule requires that certain VMs 106 be instantiated on different servers 112 (or different chasses 110). For example, an anti-affinity rule may require that MCM VM 106 be instantiated on a particular server 112 that does not contain any ASM VMs 106. As another example, an anti-affinity rule may require that MCM VMs 106 for a first VNF 102 be instantiated on a different server 112 (or chassis 110) than MCM VMs 106 for a second VNF 102. Anti-affinity rules may restrict assignment of resources 108 based on the identity or type of resource 108, VNF 102, VM 106, chassis 110, server 112, or any combination thereof.

Within these constraints, resources 108 of servers 112 may be assigned to be used to instantiate VMs 106, which in turn may be used to instantiate VNFs 102, which in turn may be used to establish sessions. The different combinations for how such resources 108 may be assigned may vary in complexity and efficiency. For example, different assignments may have different limits of the number of sessions that can be established given a particular server 112.

For example, consider a session that may require gateway VNF 102a and PCRF VNF 102b. Gateway VNF 102a may require five VMs 106 instantiated on the same server 112, and PCRF VNF 102b may require two VMs 104 instantiated on the same server 112. (Assume, for this example, that no affinity or anti-affinity rules restrict whether VMs 106 for PCRF VNF 102b may or must be instantiated on the same or different server 112 than VMs 106 for gateway VNF 102a.) In this example, each of two servers 112 may have sufficient resources 108 to support 10 VMs 106. To implement sessions using these two servers 112, first server 112 may be instantiated with 10 VMs 106 to support two instantiations of gateway VNF 102a, and second server 112 may be instantiated with 9 VMs: five VMs 106 to support one instantiation of gateway VNF 102a and four VMs 106 to support two instantiations of PCRF VNF 102b. This may leave the remaining resources 108 that could have supported the tenth VM 108 on second server 112 unused (and unusable for an instantiation of either a gateway VNF 102a or a PCRF VNF 102b). Alternatively, first server 112 may be instantiated with 10 VMs 106 for two instantiations of gateway VNF 102a and second server 112 may be instantiated with 10 VMs 106 for five instantiations of PCRF VNF 102b, using all available resources 108 to maximize the number of VMs 106 instantiated.

Consider, further, how many sessions each gateway VNF 102a and each PCRF VNF 102b may support. This may factor into which assignment of resources 108 is more efficient. For example, consider if each gateway VNF 102a supports two million sessions, and if each PCRF VNF 102b supports three million sessions. For the first configuration—three total gateway VNFs 102a (which satisfy the gateway requirement for six million sessions) and two total PCRF VNFs 102b (which satisfy the PCRF requirement for six million sessions)—would support a total of six million sessions. For the second configuration—two total gateway VNFs 102a (which satisfy the gateway requirement for four million sessions) and five total PCRF VNFs 102b (which satisfy the PCRF requirement for 15 million sessions)—would support a total of four million sessions. Thus, while the first configuration may seem less efficient looking only at the number of available resources 108 used (as resources 108 for the tenth possible VM 106 are unused), the second configuration is actually more efficient from the perspective of being the configuration that can support the greater number of sessions.

To solve the problem of determining a capacity (or, number of sessions) that can be supported by a given hardware platform 911, a given requirement for VNFs 102 to support a session, a capacity for the number of sessions each VNF 102 (e.g., of a certain type) can support, a given requirement for VMs 106 for each VNF 102 (e.g., of a certain type), a given requirement for resources 108 to support each VM 106 (e.g., of a certain type), rules dictating the assignment of resources 108 to one or more VMs 106 (e.g., affinity and anti-affinity rules), the chasses 110 and servers 112 of hardware platform 911, and the individual resources 108 of each chassis 110 or server 112 (e.g., of a certain type), an integer programming problem may be formulated.

First, a plurality of index sets may be established. For example, index set L may include the set of chasses 110. For example, if a system allows up to 6 chasses 110, this set may be:

$$L=\{1,2,3,4,5,6\},$$

where l is an element of L.

Another index set J may include the set of servers 112. For example, if a system allows up to 16 servers 112 per chassis 110, this set may be:

$$J=\{1,2,3,\ldots,16\},$$

where j is an element of J

As another example, index set K having at least one element k may include the set of VNFs 102 that may be considered. For example, this index set may include all types of VNFs 102 that may be used to instantiate a service. For example, let $$K=\{GW,PCRF\}$$

where GW represents gateway VNFs 102a and PCRF represents PCRF VNFs 102b.

Another index set I(k) may equal the set of VMs 106 for a VNF 102 k. Thus, let $$I(GW)=\{MCM,ASM,IOM,WSM,CCM,DCM\}$$

represent VMs 106 for gateway VNF 102a, where MCM represents MCM VM 106, ASM represents ASM VM 106, and each of IOM, WSM, CCM, and DCM represents a respective type of VM 106. Further, let $$I(PCRF)=\{DEP,DIR,POL,SES,MAN\}$$

represent VMs 106 for PCRF VNF 102b, where DEP represents DEP VM 106 and each of DIR, POL, SES, and MAN represent a respective type of VM 106.

Another index set V may include the set of possible instances of a given VM 104. For example, if a system allows up to 20 instances of VMs 106, this set may be:

$$V=\{1,2,3,\ldots,20\},$$

where v is an element of V.

In addition to the sets, the integer programming problem may include additional data. The characteristics of VNFs 102, VMs 106, chasses 110, or servers 112 may be factored into the problem. This data may be referred to as parameters. For example, for given VNF 102 k, the number of sessions that VNF 102 k can support may be defined as a function S(k). In an aspect, for an element k of set K, this parameter may be represented by S(k)>=0; as a measurement of the number of sessions k can support. Returning to the earlier example where gateway VNF 102a may support 2 million sessions, then this parameter may be S(GW)=2,000,000.

VM 106 modularity may be another parameter in the integer programming problem. VM 106 modularity may represent the VM 106 requirement for a type of VNF 102. For example, for k that is an element of set K and i that is an element of set I, each instance of VNF k may require M(k, i) instances of VMs 106. For example, recall the example where I(GW)={MCM, ASM, IOM, WSM, CCM, DCM}. In an example, M(GW, I(GW)) may be the set that indicates the number of each type of VM 106 that may be required to instantiate gateway VNF 102a. For example, M(GW, I(GW))={2, 16, 4, 4, 2, 4} may indicate that one instantiation of gateway VNF 102a may require two instantiations of MCM VMs 106, 16 instantiations of ACM VM 106, four instantiations of IOM VM 106, four instantiations of WSM VM 106, two instantiations of CCM VM 106, and four instantiations of DCM VM 106.

Another parameter may indicate the capacity of hardware platform 910. For example, a parameter C may indicate the number of vCPUs 108a required for each VM 106 type i and for each VNF 102 type k. For example, this may include the parameter C(k, i).

For example, if MCM VM 106 for gateway VNF 102a requires 20 vCPUs 108a, this may be represented as $$C(GW,MCM)=20.$$

However, given the complexity of the integer programming problem—the numerous variables and restrictions that must be satisfied—implementing an algorithm that may be used to solve the integer programming problem efficiently, without sacrificing optimality, may be difficult.

Figure 10:
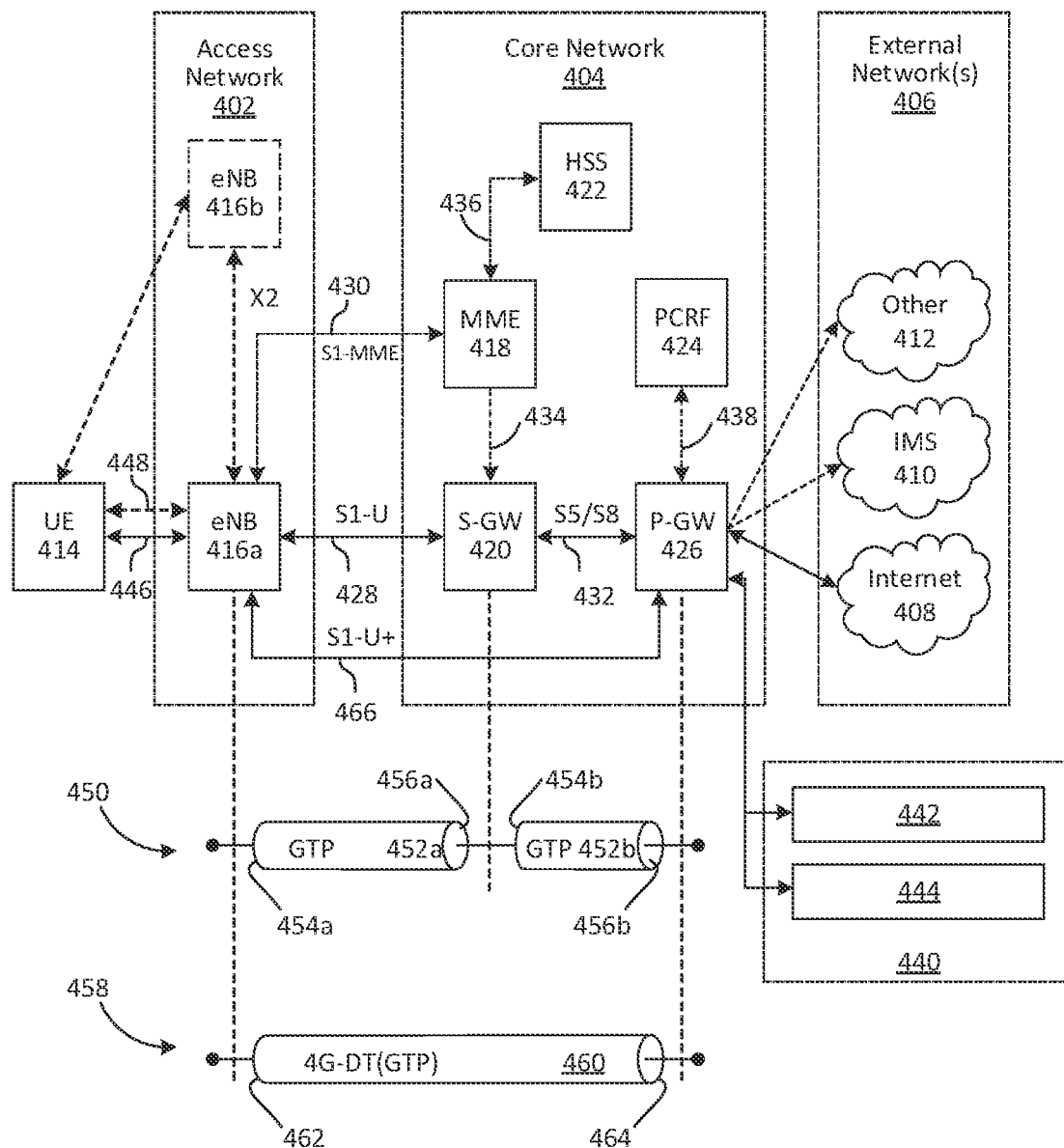
FIG. 10 is an illustration of a functional block diagram depicting one example of a Long-Term Evolution-Evolved Packet System (LTE-EPS) network architecture.

FIG. 10 illustrates a functional block diagram depicting one example of an LTE-EPS network architecture 400 that may be at least partially implemented as an SDN. Network architecture 400 disclosed herein is referred to as a modified Long-Term Evolution/Evolved Packet System (LTE-EPS) architecture 400 to distinguish it from a traditional LTE-EPS architecture.

An example modified LTE-EPS architecture 400 is based at least in part on standards developed by the 3rd Generation Partnership Project (3GPP), with information available at www.3gpp.org. LTE-EPS network architecture 400 may include an access network 402, a core network 404, e.g., an Evolved Packet Core (EPC) or Common Backbone (CBB) and one or more external networks 406, sometimes referred to as Packet Data Network (PDN) or peer entities. Different external networks 406 can be distinguished from each other by a respective network identifier, e.g., a label according to Domain Name Server (DNS) naming conventions describing an access point to the PDN. Such labels can be referred to as Access Point Names (APN). External networks 406 can include one or more trusted and non-trusted external networks such as an internet protocol (IP) network 408, an IP multimedia subsystem (IMS) network 410, and other networks 412, such as a service network, a corporate network, or the like. In an aspect, access network 402, core network 404, or external network 406 may include or communicate with network 100.

Access network 402 can include an LTE network architecture sometimes referred to as Evolved Universal mobile Telecommunication system Terrestrial Radio Access (E UTRA) and evolved UMTS Terrestrial Radio Access Network (E-UTRAN). Broadly, access network 402 can include one or more communication devices, commonly referred to as User Equipment (UE) 414, and one or more wireless access nodes, or base stations 416a, 416b. During network operations, at least one base station 416 communicates directly with UE 414. Base station 416 can be an evolved Node B (e-NodeB), with which UE 414 communicates over the air and wirelessly. UEs 414 can include, without limitation, wireless devices, e.g., satellite communication systems, portable digital assistants (PDAs), laptop computers, tablet devices and other mobile devices (e.g., cellular telephones, smart appliances, and so on). UEs 414 can connect to eNBs 416 when UE 414 is within range according to a corresponding wireless communication technology.

UE 414 generally runs one or more applications that engage in a transfer of packets between UE 414 and one or more external networks 406. Such packet transfers can include one of downlink packet transfers from external network 406 to UE 414, uplink packet transfers from UE 414 to external network 406 or combinations of uplink and downlink packet transfers. Applications can include, without limitation, web browsing, Voice over IP (VoIP), streaming media and the like. Each application can pose different Quality of Service (QoS) requirements on a respective packet transfer. Different packet transfers can be served by different bearers within core network 404, e.g., according to parameters, such as the QoS.

Core network 404 uses a concept of bearers, e.g., EPS bearers (virtual connections between UEs and Packet Gateways, PGWs), to route packets, e.g., IP traffic, between a particular gateway in core network 404 and UE 414. A bearer refers generally to an IP packet flow with a defined QoS between the particular gateway and UE 414. Access network 402, e.g., E UTRAN, and core network 404 together set up and release bearers as required by the various applications. Bearers can be classified in at least two different categories: (i) minimum guaranteed bit rate bearers, e.g., for applications, such as Voice Over IP (VoIP); and (ii)

non-guaranteed bit rate bearers that do not require guarantee bit rate, e.g., for applications, such as web browsing.

In one embodiment, the core network 404 includes various network entities, such as Mobility Management Entity (MME) 418, Serving Gateway (SGW) 420, Home Subscriber Server (HSS) 422, Policy and Charging Rules Function (PCRF) 424 and Packet Data Network Gateway (PGW) 426. In one embodiment, MME 418 comprises a control node performing a control signaling between various equipment and devices in access network 402 and core network 404. The protocols running between UE 414 and core network 404 are generally known as Non-Access Stratum (NAS) protocols.

For illustration purposes only, the terms MME 418, SGW 420, HSS 422 and PGW 426, and so on, can be server devices, but may be referred to in the subject disclosure without the word "server." It is also understood that any form of such servers can operate in a device, system, component, or other form of centralized or distributed hardware and software. It is further noted that these terms and other terms such as bearer paths and/or interfaces are terms that can include features, methodologies, and/or fields that may be described in whole or in part by standards bodies such as the 3GPP. It is further noted that some or all embodiments of the subject disclosure may in whole or in part modify, supplement, or otherwise supersede final or proposed standards published and promulgated by 3GPP.

According to traditional implementations of LTE-EPS architectures, SGW 420 routes and forwards all user data packets. SGW 420 also acts as a mobility anchor for user plane operation during handovers between base stations, e.g., during a handover from first eNB 416a to second eNB 416b as may be the result of UE 414 moving from one area of coverage, e.g., cell, to another. SGW 420 can also terminate a downlink data path, e.g., from external network 406 to UE 414 in an idle state, and trigger a paging operation when downlink data arrives for UE 414. SGW 420 can also be configured to manage and store a context for UE 414, e.g., including one or more of parameters of the IP bearer service and network internal routing information. In addition, SGW 420 can perform administrative functions, e.g., in a visited network, such as collecting information for charging (e.g., the volume of data sent to or received from the user), and/or replicate user traffic, e.g., to support a lawful interception. SGW 420 also serves as the mobility anchor for interworking with other 3GPP technologies such as universal mobile telecommunication system (UMTS).

At any given time, UE 414 is generally in one of three different states: detached, idle, or active. The detached state is typically a transitory state in which UE 414 is powered on but is engaged in a process of searching and registering with network 402. In the active state, UE 414 is registered with access network 402 and has established a wireless connection, e.g., radio resource control (RRC) connection, with eNB 416. Whether UE 414 is in an active state can depend on the state of a packet data session, and whether there is an active packet data session. In the idle state, UE 414 is generally in a power conservation state in which UE 414 typically does not communicate packets. When UE 414 is idle, SGW 420 can terminate a downlink data path, e.g., from one peer entity 406, and triggers paging of UE 414 when data arrives for UE 414. If UE 414 responds to the page, SGW 420 can forward the IP packet to eNB 416a.

HSS 422 can manage subscription-related information for a user of UE 414. For example, HSS 422 can store information such as authorization of the user, security requirements for the user, quality of service (QoS) requirements for the user, etc. HSS 422 can also hold information about external networks 406 to which the user can connect, e.g., in the form of an APN of external networks 406. For example, MME 418 can communicate with HSS 422 to determine if UE 414 is authorized to establish a call, e.g., a voice over IP (VoIP) call before the call is established.

PCRF 424 can perform QoS management functions and policy control. PCRF 424 is responsible for policy control decision-making, as well as for controlling the flow-based charging functionalities in a policy control enforcement function (PCEF), which resides in PGW 426. PCRF 424 provides the QoS authorization, e.g., QoS class identifier and bit rates that decide how a certain data flow will be treated in the PCEF and ensures that this is in accordance with the user's subscription profile.

PGW 426 can provide connectivity between the UE 414 and one or more of the external networks 406. In illustrative network architecture 400, PGW 426 can be responsible for IP address allocation for UE 414, as well as one or more of QoS enforcement and flow-based charging, e.g., according to rules from the PCRF 424. PGW 426 is also typically responsible for filtering downlink user IP packets into the different QoS-based bearers. In at least some embodiments, such filtering can be performed based on traffic flow templates. PGW 426 can also perform QoS enforcement, e.g., for guaranteed bit rate bearers. PGW 426 also serves as a mobility anchor for interworking with non-3GPP technologies such as CDMA2000.

Within access network 402 and core network 404 there may be various bearer paths/interfaces, e.g., represented by solid lines 428 and 430. Some of the bearer paths can be referred to by a specific label. For example, solid line 428 can be considered an S1-U bearer and solid line 432 can be considered an S5/S8 bearer according to LTE-EPS architecture standards. Without limitation, reference to various interfaces, such as S1, X2, S5, S8, S11 refer to EPS interfaces. In some instances, such interface designations are combined with a suffix, e.g., a "U" or a "C" to signify whether the interface relates to a "User plane" or a "Control plane." In addition, the core network 404 can include various signaling bearer paths/interfaces, e.g., control plane paths/interfaces represented by dashed lines 430, 434, 436, and 438. Some of the signaling bearer paths may be referred to by a specific label. For example, dashed line 430 can be considered as an S1-MME signaling bearer, dashed line 434 can be considered as an S11 signaling bearer and dashed line 436 can be considered as an S6a signaling bearer, e.g., according to LTE-EPS architecture standards. The above bearer paths and signaling bearer paths are only illustrated as examples and it should be noted that additional bearer paths and signaling bearer paths may exist that are not illustrated.

Also shown is a novel user plane path/interface, referred to as the S1-U+ interface 466. In the illustrative example, the S1-U+ user plane interface extends between the eNB 416a and PGW 426. Notably, S1-U+ path/interface does not include SGW 420, a node that is otherwise instrumental in configuring and/or managing packet forwarding between eNB 416a and one or more external networks 406 by way of PGW 426. As disclosed herein, the S1-U+ path/interface facilitates autonomous learning of peer transport layer addresses by one or more of the network nodes to facilitate a self-configuring of the packet forwarding path. In particular, such self-configuring can be accomplished during handovers in most scenarios so as to reduce any extra signaling load on the S/PGWs 420, 426 due to excessive handover events.

In some embodiments, PGW 426 is coupled to storage device 440, shown in phantom. Storage device 440 can be integral to one of the network nodes, such as PGW 426, for example, in the form of internal memory and/or disk drive. It is understood that storage device 440 can include registers suitable for storing address values. Alternatively, or in addition, storage device 440 can be separate from PGW 426, for example, as an external hard drive, a flash drive, and/or network storage.

Storage device 440 selectively stores one or more values relevant to the forwarding of packet data. For example, storage device 440 can store identities and/or addresses of network entities, such as any of network nodes 418, 420, 422, 424, and 426, eNBs 416 and/or UE 414. In the illustrative example, storage device 440 includes a first storage location 442 and a second storage location 444. First storage location 442 can be dedicated to storing a Currently Used Downlink address value 442. Likewise, second storage location 444 can be dedicated to storing a Default Downlink Forwarding address value 444. PGW 426 can read and/or write values into either of storage locations 442, 444, for example, managing Currently Used Downlink Forwarding address value 442 and Default Downlink Forwarding address value 444 as disclosed herein.

In some embodiments, the Default Downlink Forwarding address for each EPS bearer is the SGW S5-U address for each EPS Bearer. The "Currently Used Downlink Forwarding address" for each EPS bearer in PGW 426 can be set every time when PGW 426 receives an uplink packet, e.g., a GTP-U uplink packet, with a new source address for a corresponding EPS bearer. When UE 414 is in an idle state, the "Currently Used Downlink Forwarding address" field for each EPS bearer of UE 414 can be set to a "null" or other suitable value.

In some embodiments, the Default Downlink Forwarding address is only updated when PGW 426 receives a new SGW S5-U address in a predetermined message or messages. For example, the Default Downlink Forwarding address is only updated when PGW 426 receives one of a Create Session Request, Modify Bearer Request and Create Bearer Response messages from SGW 420.

As values 442, 444 can be maintained and otherwise manipulated on a per bearer basis, it is understood that the storage locations can take the form of tables, spreadsheets, lists, and/or other data structures generally well understood and suitable for maintaining and/or otherwise manipulate forwarding addresses on a per bearer basis.

It should be noted that access network 402 and core network 404 are illustrated in a simplified block diagram in FIG. 10. In other words, either or both of access network 402 and the core network 404 can include additional network elements that are not shown, such as various routers, switches and controllers. In addition, although FIG. 10 illustrates only a single one of each of the various network elements, it should be noted that access network 402 and core network 404 can include any number of the various network elements. For example, core network 404 can include a pool (i.e., more than one) of MMEs 418, SGWs 420 or PGWs 426.

In the illustrative example, data traversing a network path between UE 414, eNB 416a, SGW 420, PGW 426 and external network 406 may be considered to constitute data transferred according to an end-to-end IP service. However, for the present disclosure, to properly perform establishment management in LTE-EPS network architecture 400, the core network, data bearer portion of the end-to-end IP service is analyzed.

An establishment may be defined herein as a connection set up request between any two elements within LTE-EPS network architecture 400. The connection set up request may be for user data or for signaling. A failed establishment may be defined as a connection set up request that was unsuccessful. A successful establishment may be defined as a connection set up request that was successful.

In one embodiment, a data bearer portion comprises a first portion (e.g., a data radio bearer 446) between UE 414 and eNB 416a, a second portion (e.g., an S1 data bearer 428) between eNB 416a and SGW 420, and a third portion (e.g., an S5/S8 bearer 432) between SGW 420 and PGW 426. Various signaling bearer portions are also illustrated in FIG. 10. For example, a first signaling portion (e.g., a signaling radio bearer 448) between UE 414 and eNB 416a, and a second signaling portion (e.g., S1 signaling bearer 430) between eNB 416a and MME 418.

In at least some embodiments, the data bearer can include tunneling, e.g., IP tunneling, by which data packets can be forwarded in an encapsulated manner, between tunnel endpoints. Tunnels, or tunnel connections can be identified in one or more nodes of network 100, e.g., by one or more of tunnel endpoint identifiers, an IP address and a user datagram protocol port number. Within a particular tunnel connection, payloads, e.g., packet data, which may or may not include protocol related information, are forwarded between tunnel endpoints.

An example of first tunnel solution 450 includes a first tunnel 452a between two tunnel endpoints 454a and 456a, and a second tunnel 452b between two tunnel endpoints 454b and 456b. In the illustrative example, first tunnel 452a is established between evolved Node B (eNodeB, eNB) 416a and SGW 420. Accordingly, first tunnel 452a includes a first tunnel endpoint 454a corresponding to an S1-U address of eNB 416a (referred to herein as the eNB S1-U address), and second tunnel endpoint 456a corresponding to an S1-U address of SGW 420 (referred to herein as the SGW S1-U address). Likewise, second tunnel 452b includes first tunnel endpoint 454b corresponding to an S5-U address of SGW 420 (referred to herein as the SGW S5-U address), and second tunnel endpoint 456b corresponding to an S5-U address of PGW 426 (referred to herein as the PGW S5-U address).

In at least some embodiments, first tunnel solution 450 is referred to as a two-tunnel solution, e.g., according to the General Packet Radio Service (GPRS) Tunneling Protocol User Plane (GTPv1-U based), as described in 3GPP specification TS 29.281, incorporated herein in its entirety. It is understood that one or more tunnels are permitted between each set of tunnel end points. For example, each subscriber can have one or more tunnels, e.g., one for each Packet Data Protocol (PDP) context that they have active, as well as possibly having separate tunnels for specific connections with different quality of service requirements, and so on.

An example of second tunnel solution 458 includes a single or direct tunnel 460 between tunnel endpoints 462 and 464. In the illustrative example, direct tunnel 460 is established between eNB 416a and PGW 426, without subjecting packet transfers to processing related to SGW 420. Accordingly, direct tunnel 460 includes first tunnel endpoint 462 corresponding to the eNB S1-U address, and second tunnel endpoint 464 corresponding to the PGW S5-U address. Packet data received at either end can be encapsulated into a payload and directed to the corresponding address of the other end of the tunnel. Such direct tunneling avoids processing, e.g., by SGW 420 that would otherwise relay packets between the same two endpoints, e.g., according to a protocol, such as the GTP-U protocol.

In some scenarios, direct tunneling solution 458 can forward user plane data packets between eNB 416a and PGW 426, by way of SGW 420. That is, SGW 420 can serve a relay function, by relaying packets between two tunnel endpoints 416a, 426. In other scenarios, direct tunneling solution 458 can forward user data packets between eNB 416a and PGW 426, by way of the S1 U+ interface 466, thereby bypassing SGW 420.

Generally, UE 414 can have one or more bearers at any one time. The number and types of bearers can depend on applications, default requirements, and so on. It is understood that the techniques disclosed herein, including the configuration, management and use of various tunnel solutions 450, 458, can be applied to the bearers on an individual bases. That is, if user data packets of one bearer, say a bearer associated with a VoIP service of UE 414, then the forwarding of all packets of that bearer are handled in a similar manner. Continuing with this example, the same UE 414 can have another bearer associated with it through the same eNB 416a. This other bearer, for example, can be associated with a relatively low-rate data session forwarding user data packets through core network 404 simultaneously with the first bearer. Likewise, the user data packets of the other bearer are also handled in a similar manner, without necessarily following a forwarding path or solution of the first bearer. Thus, one of the bearers may be forwarded through direct tunnel 458; whereas, another one of the bearers may be forwarded through a two-tunnel solution 450.

Figure 11:
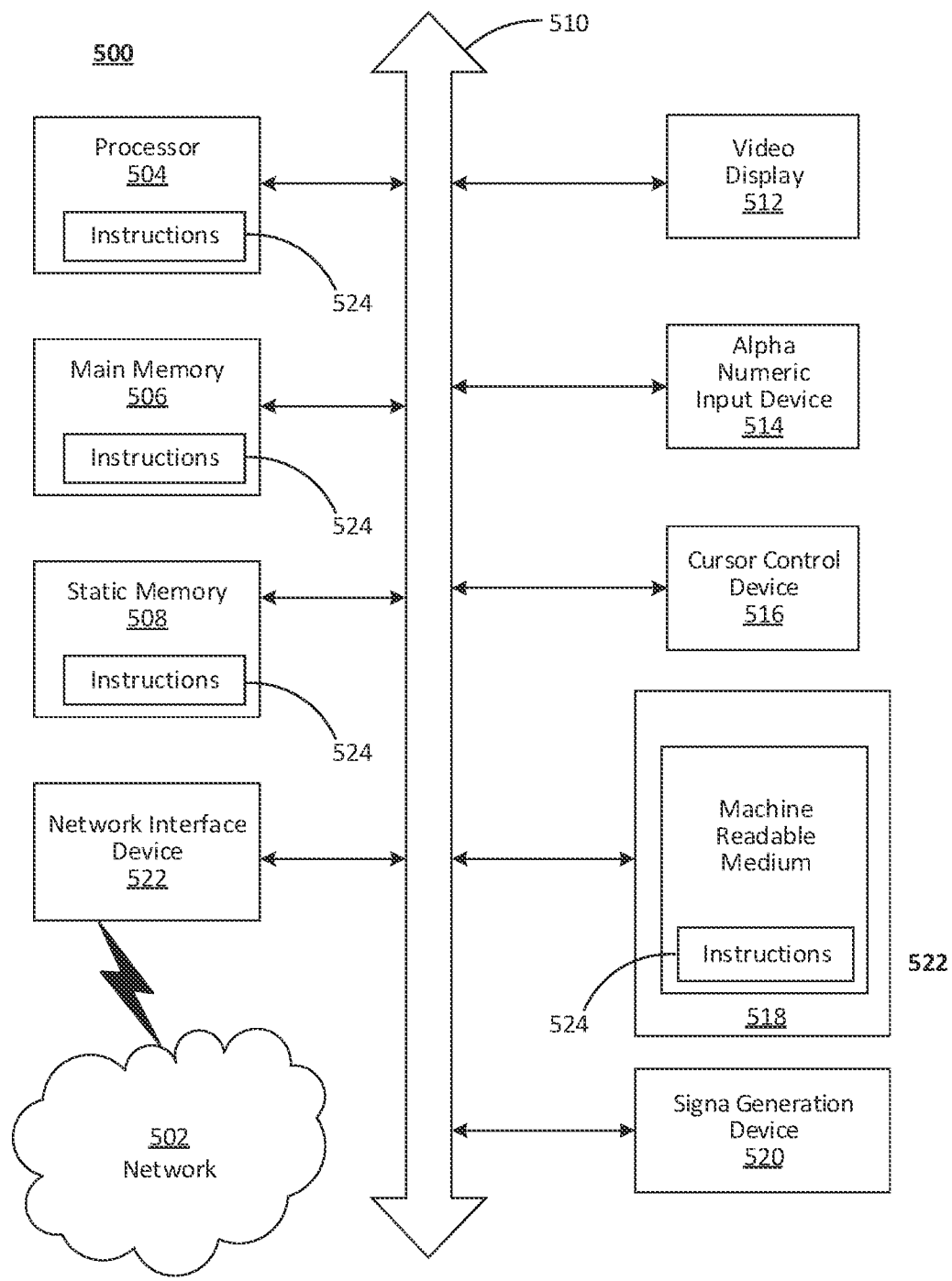
FIG. 11 depicts an exemplary diagrammatic representation of a machine in the form of a computer system.

FIG. 11 depicts an exemplary diagrammatic representation of a machine in the form of a computer system 500 within which a set of instructions, when executed, may cause the machine to perform any one or more of the methods described above. One or more instances of the machine can operate, for example, as processor 504 for UE 414, eNB 416, MME 418, SGW 420, HSS 422, PCRF 424, PGW 426 and other devices. In some embodiments, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid-state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the embodiments described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium 518 having instructions 524 on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

Figure 12:
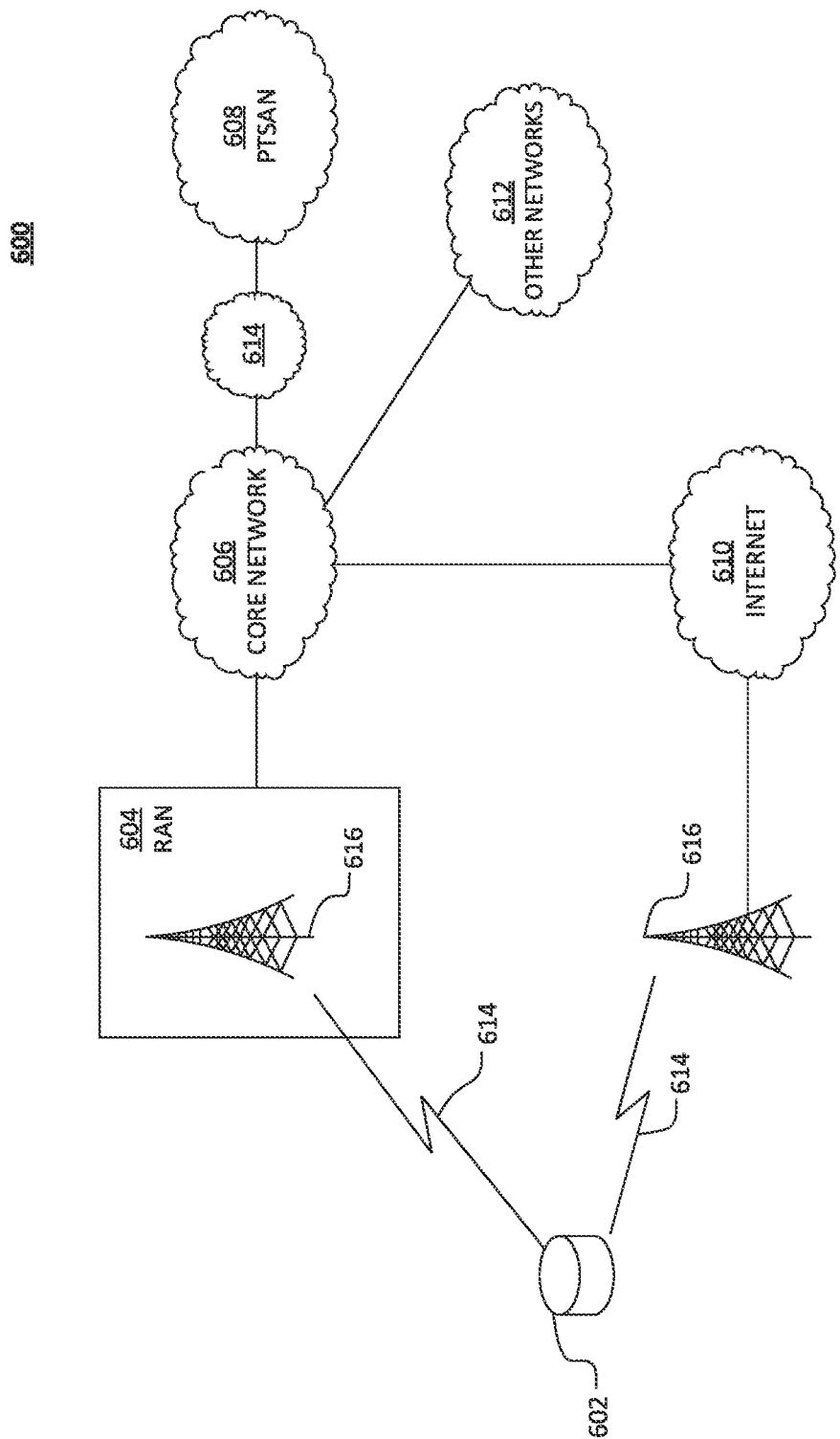
FIG. 12 illustrates a base station with a direct connection to Internet.

As shown in FIG. 12, telecommunication system 600 may include wireless transmit/receive units (WTRUs) 602, a Radio Access Network (RAN) 604, a core network 606, a public switched telephone network (PSTN) 608, the Internet 610, or other networks 612, though it will be appreciated that the disclosed examples contemplate any number of Wireless Transmit/Receive Units (WTRUs), base stations, networks, or network elements. Each WTRU 602 may be any type of device configured to operate or communicate in a wireless environment. For example, a WTRU may comprise a mobile device, network device or the like, or any combination thereof. By way of example, WTRUs 602 may be configured to transmit or receive wireless signals and may include a UE, a mobile station, a mobile device, a fixed or mobile subscriber unit, a pager, a cellular telephone, a PDA, a smartphone, a laptop, a netbook, a personal computer, a wireless sensor, consumer electronics, or the like. WTRUs 602 may be configured to transmit or receive wireless signals over an air interface 614.

Telecommunication system 600 may also include one or more base stations 616. Each of base stations 616 may be any type of device configured to wirelessly interface with at least one of the WTRUs 602 to facilitate access to one or more communication networks, such as core network 606, PTSN 608, Internet 610, or other networks 612. By way of example, base stations 616 may be a base transceiver station (BTS), a Node-B, an eNode B, a Home Node B, a Home eNode B, a site controller, an access point (AP), a wireless router, or the like. While base stations 616 are each depicted as a single element, it will be appreciated that base stations 616 may include any number of interconnected base stations or network elements.

RAN 604 may include one or more base stations 616, along with other network elements (not shown), such as a base station controller (BSC), a radio network controller (RNC), or relay nodes. One or more base stations 616 may be configured to transmit or receive wireless signals within a particular geographic region, which may be referred to as a cell (not shown). The cell may further be divided into cell sectors. For example, the cell associated with base station 616 may be divided into three sectors such that base station 616 may include three transceivers: one for each sector of the cell. In another example, base station 616 may employ multiple-input multiple-output (MIMO) technology and, therefore, may utilize multiple transceivers for each sector of the cell.

Base stations 616 may communicate with one or more of WTRUs 602 over air interface 614, which may be any suitable wireless communication link (e.g., radio frequency (RF), microwave, infrared (IR), ultraviolet (UV), or visible light). Air interface 614 may be established using any suitable radio access technology (RAT).

More specifically, as noted above, telecommunication system 600 may be a multiple access system and may employ one or more channel access schemes, such as Code Division Multiple Access (CDMA), Time-Division Multiple Access (TDMA), Frequency Division Multiple Access (FDMA), Orthogonal FDMA (OFDMA), Single-Carrier FDMA (SC-FDMA), or the like. For example, base station 616 in RAN 604 and WTRUs 602 connected to RAN 604 may implement a radio technology such as Universal Mobile Telecommunications System (UMTS) Terrestrial Radio Access (UTRA) that may establish air interface 614 using wideband CDMA (WCDMA). WCDMA may include communication protocols, such as High-Speed Packet Access (HSPA) or Evolved HSPA (HSPA+). HSPA may include High-Speed Downlink Packet Access (HSDPA) or High-Speed Uplink Packet Access (HSUPA).

As another example base station 616 and WTRUs 602 that are connected to RAN 604 may implement a radio technology such as Evolved UMTS Terrestrial Radio Access (E-UTRA), which may establish air interface 614 using LTE or LTE-Advanced (LTE-A).

Optionally base station 616 and WTRUs 602 connected to RAN 604 may implement radio technologies such as IEEE 802.16 (i.e., Worldwide Interoperability for Microwave Access (WiMAX)), CDMA2000, CDMA2000 1x, CDMA2000 Evolution-Data Optimized (EV-DO), Interim Standard 2000 (IS-2000), Interim Standard 95 (IS-95), Interim Standard 856 (IS-856), GSM, Enhanced Data rates for GSM Evolution (EDGE), Global System for Mobile Communication (GSM) EDGE (GERAN), or the like.

Base station 616 may be a wireless router, Home Node B, Home eNode B, or access point, for example, and may utilize any suitable RAT for facilitating wireless connectivity in a localized area, such as a place of business, a home, a vehicle, a campus, or the like. For example, base station 616 and associated WTRUs 602 may implement a radio technology such as IEEE 802.11 to establish a wireless local area network (WLAN). As another example, base station 616 and associated WTRUs 602 may implement a radio technology such as IEEE 802.15 to establish a wireless personal area network (WPAN). In yet another example, base station 616 and associated WTRUs 602 may utilize a cellular-based RAT (e.g., WCDMA, CDMA2000, GSM, LTE, LTE-A, etc.) to establish a picocell or femtocell. As shown in FIG. 12, base station 616 may have a direct connection to Internet 610. Thus, base station 616 may not be required to access Internet 610 via core network 606.

RAN 604 may be in communication with core network 606, which may be any type of network configured to provide voice, data, applications, and/or voice over internet protocol (VoIP) services to one or more WTRUs 602. For example, core network 606 may provide call control, billing services, mobile location-based services, pre-paid calling, Internet connectivity, video distribution or high-level security functions, such as user authentication. Although not shown in FIG. 12, it will be appreciated that RAN 604 or core network 606 may be in direct or indirect communication with other RANs that employ the same RAT as RAN 604 or a different RAT. For example, in addition to being connected to RAN 604, which may be utilizing an E-UTRA radio technology, core network 606 may also be in communication with another RAN (not shown) employing a GSM radio technology.

Core network 606 may also serve as a gateway for WTRUs 602 to access PSTN 608, Internet 610, or other networks 612. PSTN 608 may include circuit-switched telephone networks that provide plain old telephone service (POTS). For LTE core networks, core network 606 may use IMS core 606 to provide access to PSTN 608. Internet 610 may include a global system of interconnected computer networks or devices that use common communication protocols, such as the transmission control protocol (TCP), user datagram protocol (UDP), or Internet Protocol (IP) in the TCP/IP internet protocol suite. Other networks 612 may include wired or wireless communications networks owned or operated by other service providers. For example, other networks 612 may include another core network connected to one or more RANs, which may employ the same RAT as RAN 604 or a different RAT.

Some or all WTRUs 602 in telecommunication system 600 may include multi-mode capabilities. That is, WTRUs 602 may include multiple transceivers for communicating with different wireless networks over different wireless links. For example, one or more WTRUs 602 may be configured to communicate with base station 616, which may employ a cellular-based radio technology, and with base station 616, which may employ an IEEE 802 radio technology.

Figure 13:
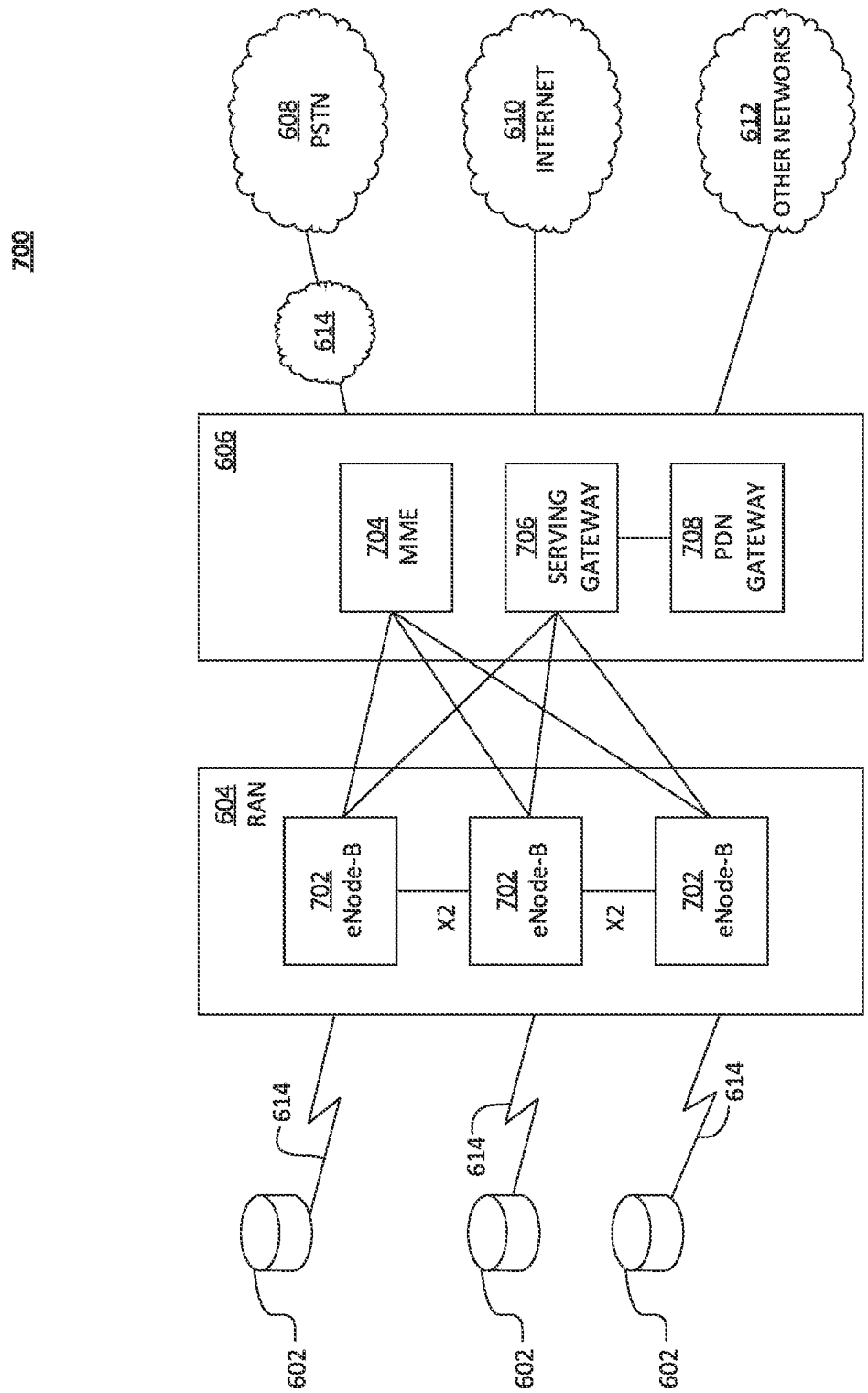
FIG. 13 is an example system including RAN and core network.

FIG. 13 is an example system 700 including RAN 604 and core network 606. As noted above, RAN 604 may employ an E-UTRA radio technology to communicate with WTRUs 602 over air interface 614. RAN 604 may also be in communication with core network 606.

RAN 604 may include any number of eNode-Bs 702 while remaining consistent with the disclosed technology. One or more eNode-Bs 702 may include one or more transceivers for communicating with the WTRUs 602 over air interface 614. Optionally, eNode-Bs 702 may implement MIMO technology. Thus, one of eNode-Bs 702, for example, may use multiple antennas to transmit wireless signals to, or receive wireless signals from, one of WTRUs 602.

Each of eNode-Bs 702 may be associated with a particular cell (not shown) and may be configured to handle radio resource management decisions, handover decisions, scheduling of users in the uplink or downlink, or the like. As shown in FIG. 13 eNode-Bs 702 may communicate with one another over an X2 interface.

Core network 606 shown in FIG. 13 may include a mobility management gateway or entity (MME) 704, a serving gateway 706, or a packet data network (PDN) gateway 708. While each of the foregoing elements are depicted as part of core network 606, it will be appreciated that any one of these elements may be owned or operated by an entity other than the core network operator.

MME 704 may be connected to each of eNode-Bs 702 in RAN 604 via an S1 interface and may serve as a control node. For example, MME 704 may be responsible for authenticating users of WTRUs 602, bearer activation or deactivation, selecting a particular serving gateway during an initial attach of WTRUs 602, or the like. MME 704 may also provide a control plane function for switching between RAN 604 and other RANs (not shown) that employ other radio technologies, such as GSM or Wideband CDMA (WCDMA).

Serving gateway 706 may be connected to each of eNode-Bs 702 in RAN 604 via the S1 interface. Serving gateway 706 may generally route or forward user data packets to or from the WTRUs 602. Serving gateway 706 may also perform other functions, such as anchoring user planes during inter-eNode B handovers, triggering paging when downlink data is available for WTRUs 602, managing or storing contexts of WTRUs 602, or the like.

Serving gateway 706 may also be connected to PDN gateway 708, which may provide WTRUs 602 with access to packet-switched networks, such as Internet 610, to facilitate communications between WTRUs 602 and IP-enabled devices.

Core network 606 may facilitate communications with other networks. For example, core network 606 may provide WTRUs 602 with access to circuit-switched networks, such as PSTN 608, such as through IMS core 606 to facilitate communications between WTRUs 602 and traditional landline communications devices. In addition, core network 606 may provide the WTRUs 602 with access to other networks 612, which may include other wired or wireless networks that are owned or operated by other service providers.

Figure 14:
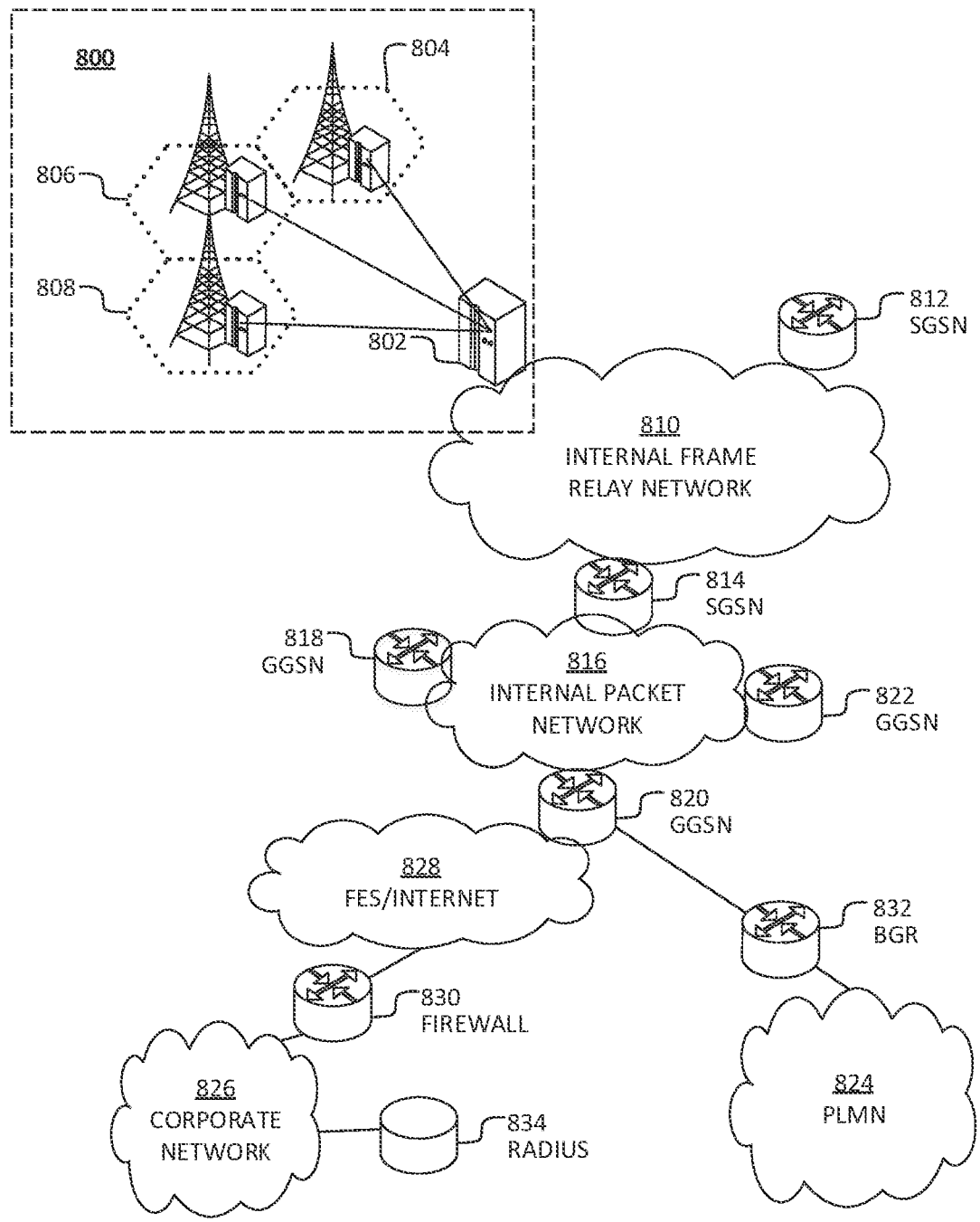
FIG. 14 illustrates an overall block diagram of an example packet-based mobile cellular network environment.

FIG. 14 depicts an overall block diagram of an example packet-based mobile cellular network environment, such as a GPRS network as described herein. In the example packet-based mobile cellular network environment shown in FIG. 14, there are a plurality of base station subsystems (BSS) 800 (only one is shown), each of which comprises a base station controller (BSC) 802 serving a plurality of Baseband Transceiver Stations (BTSs), such as BTSs 804, 806, 808. BTSs 804, 806, 808 are the access points where users of packet-based mobile devices become connected to the wireless network. In example fashion, the packet traffic originating from mobile devices is transported via an over-the-air interface to BTS 808, and from BTS 808 to BSC 802. Base station subsystems, such as BSS 800, are a part of internal frame relay network 810 that can include a Serving GPRS Support Node (SGSN), such as SGSN 812 or SGSN 814. Each SGSN 812, 814 is connected to an internal packet network 816 through which SGSN 812, 814 can route data packets to or from a plurality of gateway GPRS support nodes (GGSN) 818, 820, 822. As illustrated, SGSN 814 and GGSNs 818, 820, 822 are part of internal packet network 816. GGSNs 818, 820, 822 mainly provide an interface to external IP networks such as Public Land Mobile Network (PLMN) 824, corporate intranets/internets 826, or Fixed-End System (FES) or the public Internet 828. As illustrated, subscriber corporate network 826 may be connected to GGSN 820 via a firewall 830. PLMN 824 may be connected to GGSN 820 via a border gateway router (BGR) 832. A Remote Authentication Dial-In User Service (RADIUS) server 834 may be used for caller authentication when a user calls corporate network 826.

Generally, there may be a several cell sizes in a network, referred to as macro, micro, pico, femto or umbrella cells. The coverage area of each cell is different in different environments. Macro cells can be regarded as cells in which the base station antenna is installed in a mast or a building above average roof top level. Micro cells are cells whose antenna height is under average roof top level. Micro cells are typically used in urban areas. Pico cells are small cells having a diameter of a few dozen meters. Pico cells are used mainly indoors. Femto cells have the same size as pico cells, but a smaller transport capacity. Femto cells are used indoors, in residential or small business environments. On the other hand, umbrella cells are used to cover shadowed regions of smaller cells and fill in gaps in coverage between those cells.

Figure 15:
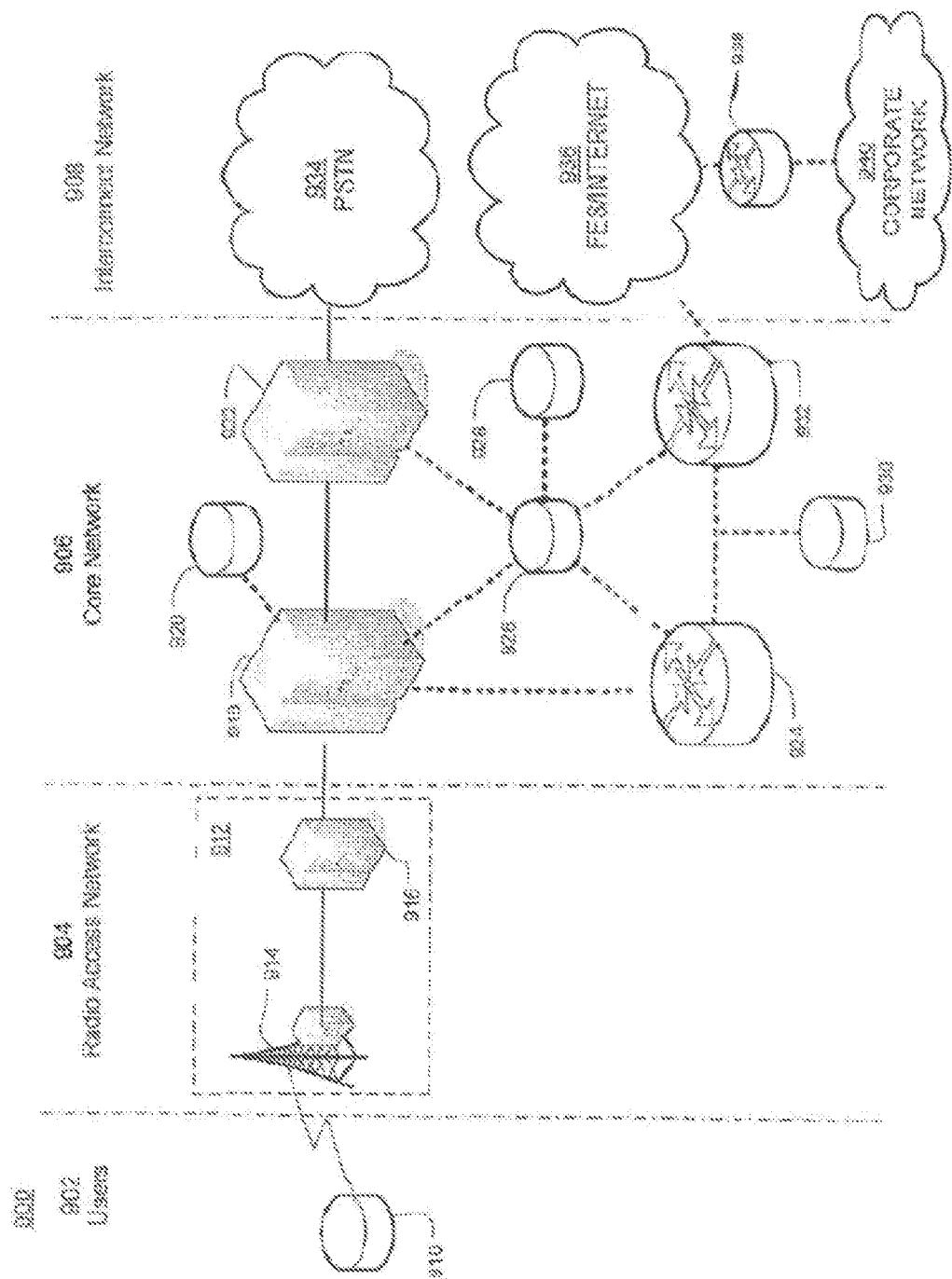
FIG. 15 illustrates an architecture of a typical General Packet Radio Service (GPRS) network.

FIG. 15 illustrates an architecture of a typical GPRS network 900 as described herein. The architecture depicted in FIG. 15 may be segmented into four groups: users 902, RAN 904, core network 906, and interconnect network 908. Users 902 comprise a plurality of end users, who each may use one or more devices 910. Note that device 910 is referred to as a mobile subscriber (MS) in the description of network shown in FIG. 15. In an example, device 910 comprises a communications device (e.g., mobile device 102, mobile positioning center 116, network device 300, any of detected devices 500, second device 508, access device 604, access device 606, access device 608, access device 610 or the like, or any combination thereof). Radio access network 904 comprises a plurality of BSSs such as BSS 912, which includes a BTS 914 and a BSC 916. Core network 906 may include a host of various network elements. As illustrated in FIG. 15, core network 906 may comprise MSC 918, service control point (SCP) 920, gateway MSC (GMSC) 922, SGSN 924, home location register (HLR) 926, authentication center (AuC) 928, domain name system (DNS) server 930, and GGSN 932. Interconnect network 908 may also comprise a host of various networks or other network elements. As illustrated in FIG. 15, interconnect network 908 comprises a PSTN 934, an FES/Internet 936, firewall 938, or a corporate network 940.

An MSC can be connected to a large number of BSCs. At MSC 918, for instance, depending on the type of traffic, the traffic may be separated in that voice may be sent to PSTN 934 through GMSC 922, or data may be sent to SGSN 924, which then sends the data traffic to GGSN 932 for further forwarding.

When MSC 918 receives call traffic, for example, from BSC 916, it sends a query to a database hosted by SCP 920, which processes the request and issues a response to MSC 918 so that it may continue call processing as appropriate.

Home Location Register (HLR) 926 is a centralized database for users to register to the GPRS network. HLR 926 stores static information about the subscribers such as the International Mobile Subscriber Identity (IMSI), subscribed services, or a key for authenticating the subscriber. HLR 926 also stores dynamic subscriber information such as the current location of the MS. Associated with HLR 926 is AuC 928, which is a database that contains the algorithms for authenticating subscribers and includes the associated keys for encryption to safeguard the user input for authentication.

In the following, depending on context, "mobile subscriber" or "MS" sometimes refers to the end user and sometimes to the actual portable device, such as a mobile device, used by an end user of the mobile cellular service. When a mobile subscriber turns on his or her mobile device, the mobile device goes through an attach process by which the mobile device attaches to an SGSN of the GPRS network. In FIG. 15, when MS 910 initiates the attach process by turning on the network capabilities of the mobile device, an attach request is sent by MS 910 to SGSN 924. The SGSN 924 queries another SGSN, to which MS 910 was attached before, for the identity of MS 910. Upon receiving the identity of MS 910 from the other SGSN, SGSN 924 requests more information from MS 910. This information is used to authenticate MS 910 together with the information provided by HLR 926. Once verified, SGSN 924 sends a location update to HLR 926 indicating the change of location to a new SGSN, in this case SGSN 924. HLR 926 notifies the old SGSN, to which MS 910 was attached before, to cancel the location process for MS 910. HLR 926 then notifies SGSN 924 that the location update has been performed. At this time, SGSN 924 sends an Attach Accept message to MS 910, which in turn sends an Attach Complete message to SGSN 924.

Next, MS 910 establishes a user session with the destination network, corporate network 940, by going through a Packet Data Protocol (PDP) activation process. Briefly, in the process, MS 910 requests access to the Access Point Name (APN), for example, UPS.com, and SGSN 924 receives the activation request from MS 910. SGSN 924 then initiates a DNS query to learn which GGSN 932 has access to the UPS.com APN. The DNS query is sent to a DNS server within core network 906, such as DNS server 930, which is provisioned to map to one or more GGSNs in core network 906. Based on the APN, the mapped GGSN 932 can access requested corporate network 940. SGSN 924 then sends to GGSN 932 a Create PDP Context Request message that contains necessary information. GGSN 932 sends a Create PDP Context Response message to SGSN 924, which then sends an Activate PDP Context Accept message to MS 910.

Once activated, data packets of the call made by MS 910 can then go through RAN 904, core network 906, and interconnect network 908, in a particular FES/Internet 936 and firewall 938, to reach corporate network 940.

Figure 16:
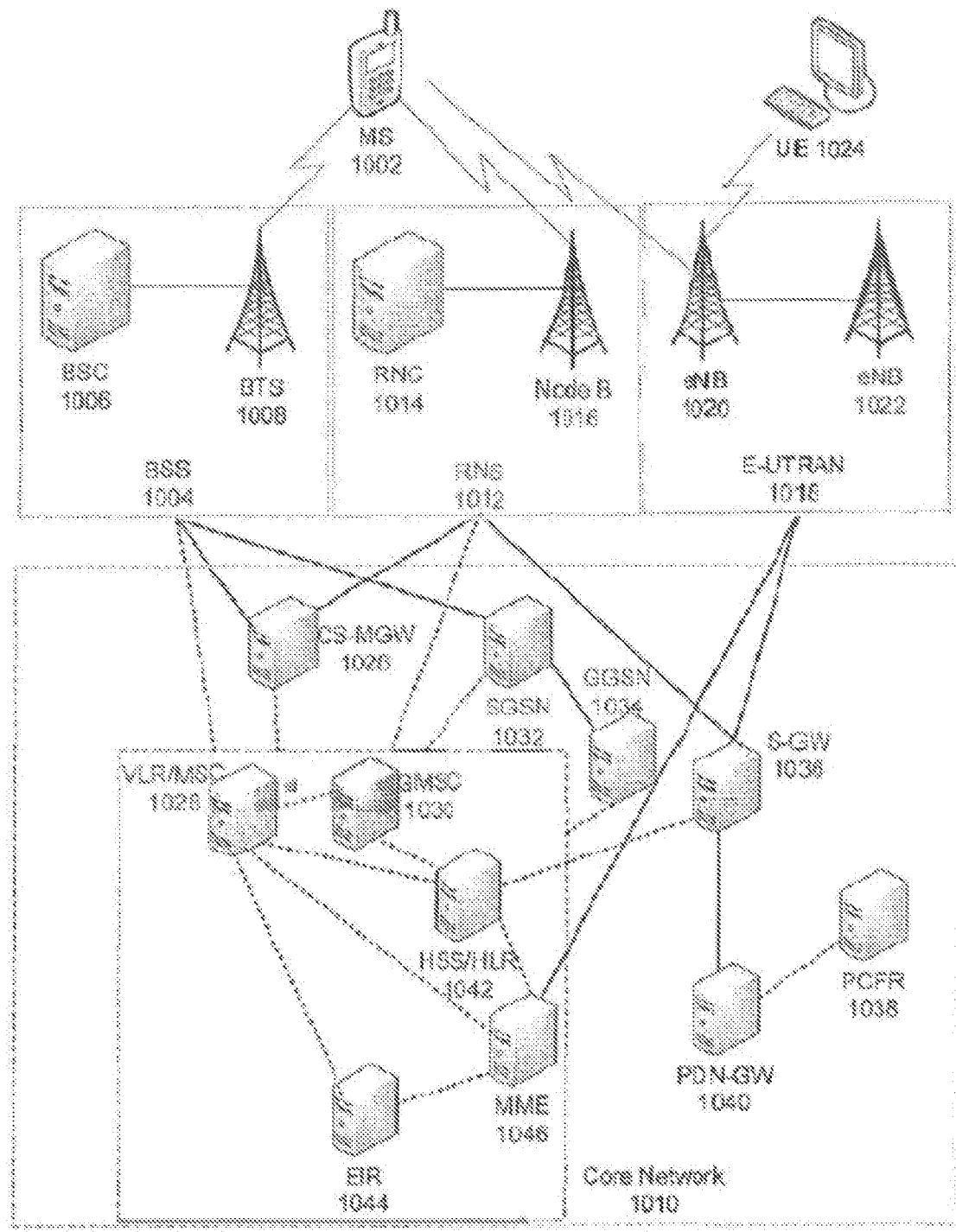
FIG. 16 illustrates a Public Land Mobile Network (PLMN) block diagram view of an example architecture that may be replaced by a telecommunications system.

FIG. 16 illustrates a PLMN block diagram view of an example architecture that may be replaced by a telecommunications system. In FIG. 16, solid lines may represent user traffic signals, and dashed lines may represent support signaling. MS 1002 is the physical equipment used by the PLMN subscriber. For example, network device or the like may serve as MS 1002. MS 1002 may be one of, but not limited to, a cellular telephone, a cellular telephone in combination with another electronic device or any other wireless mobile communication device.

MS 1002 may communicate wirelessly with BSS 1004. BSS 1004 contains BSC 1006 and a BTS 1008. BSS 1004 may include a single BSC 1006/BTS 1008 pair (base station) or a system of BSC/BTS pairs that are part of a larger network. BSS 1004 is responsible for communicating with MS 1002 and may support one or more cells. BSS 1004 is responsible for handling cellular traffic and signaling between MS 1002 and a core network 1010. Typically, BSS 1004 performs functions that include, but are not limited to, digital conversion of speech channels, allocation of channels to mobile devices, paging, or transmission/reception of cellular signals.

Additionally, MS 1002 may communicate wirelessly with RNS 1012. RNS 1012 contains a Radio Network Controller (RNC) 1014 and one or more Nodes B 1016. RNS 1012 may support one or more cells. RNS 1012 may also include one or more RNC 1014/Node B 1016 pairs or alternatively a single RNC 1014 may manage multiple Nodes B 1016. RNS 1012 is responsible for communicating with MS 1002 in its geographically defined area. RNC 1014 is responsible for controlling Nodes B 1016 that are connected to it and is a control element in a UMTS radio access network. RNC 1014 performs functions such as, but not limited to, load control, packet scheduling, handover control, security functions, or controlling MS 1002 access to core network 1010.

An E-UTRA Network (E-UTRAN) 1018 is a RAN that provides wireless data communications for MS 1002 and UE 1024. E-UTRAN 1018 provides higher data rates than traditional UMTS. It is part of the LTE upgrade for mobile networks, and later releases meet the requirements of the International Mobile Telecommunications (IMT) Advanced and are commonly known as a 4G networks. E-UTRAN 1018 may include of series of logical network components such as E-UTRAN Node B (eNB) 1020 and E-UTRAN Node B (eNB) 1022. E-UTRAN 1018 may contain one or more eNBs. User equipment (UE) 1024 may be any mobile device capable of connecting to E-UTRAN 1018 including, but not limited to, a personal computer, laptop, mobile device, wireless router, or other device capable of wireless connectivity to E-UTRAN 1018. The improved performance of the E-UTRAN 1018 relative to a typical UMTS network allows for increased bandwidth, spectral efficiency, and functionality including, but not limited to, voice, high-speed applications, large data transfer or IPTV, while still allowing for full mobility.

Typically, MS 1002 may communicate with any or all of BSS 1004, RNS 1012, or E-UTRAN 1018. In an illustrative system, each of BSS 1004, RNS 1012, and E-UTRAN 1018 may provide MS 1002 with access to core network 1010. Core network 1010 may include of a series of devices that route data and communications between end users. Core network 1010 may provide network service functions to users in the circuit switched (CS) domain or the packet switched (PS) domain. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed or handled independently of all other packets in the PS domain and does not require dedicated network resources.

The circuit-switched Media Gateway (MGW) function (CS-MGW) 1026 is part of core network 1010 and interacts with VLR/MSC server 1028 and GMSC server 1030 in order to facilitate core network 1010 resource control in the CS domain. Functions of CS-MGW 1026 include, but are not limited to, media conversion, bearer control, payload processing or other mobile network processing such as handover or anchoring. CS-MGW 1026 may receive connections to MS 1002 through BSS 1004 or RNS 1012.

SGSN 1032 stores subscriber data regarding MS 1002 in order to facilitate network functionality. SGSN 1032 may store subscription information such as, but not limited to, the IMSI, temporary identities, or PDP addresses. SGSN 1032 may also store location information such as, but not limited to, GGSN address for each GGSN 1034 where an active PDP exists. GGSN 1034 may implement a location register function to store subscriber data it receives from SGSN 1032 such as subscription or location information.

Serving gateway (S-GW) 1036 is an interface which provides connectivity between E-UTRAN 1018 and core network 1010. Functions of S-GW 1036 include, but are not limited to, packet routing, packet forwarding, transport level packet processing, or user plane mobility anchoring for inter-network mobility. PCRF 1038 uses information gathered from P-GW 1036, as well as other sources, to make applicable policy and charging decisions related to data flows, network resources or other network administration functions. PDN gateway (PDN-GW) 1040 may provide user-to-services connectivity functionality including, but not limited to, GPRS/EPC network anchoring, bearer session anchoring and control, or IP address allocation for PS domain connections.

HSS/HLR 1042 is a database for user information and stores subscription data regarding MS 1002 or UE 1024 for handling calls or data sessions. Networks may contain one HSS/HLR 1042 or more if additional resources are required. Example data stored by HSS 1042 include, but is not limited to, user identification, numbering or addressing information, security information, or location information. HSS/HLR

1042 may also provide call or session establishment procedures in both the PS and CS domains.

VLR/MSC Server 1028 provides user location functionality. When MS 1002 enters a new network location, it begins a registration procedure. An MSC server for that location transfers the location information to the VLR for the area. A VLR and MSC server may be located in the same computing environment, as is shown by VLR/MSC server 1028, or alternatively may be located in separate computing environments. A VLR may contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for MS 1002 registration or procedures for handover of MS 1002 to a different section of core network 1010. Gateway Mobile Services Switching Center (GMSC) server 1030 may serve as a connection to alternate GMSC servers for other MSs in larger networks.

Equipment Identity Register (EIR) 1044 is a logical element which may store the IMEI for MS 1002. User equipment may be classified as either "whitelisted" or "black-listed" depending on its status in the network. If MS 1002 is stolen and put to use by an unauthorized user, it may be registered as "black-listed" in EIR 1044, preventing its use on the network. An MME 1046 is a control node which may track MS 1002 or UE 1024 if the devices are idle. Additional functionality may include the ability of MME 1046 to contact idle MS 1002 or UE 1024 if retransmission of a previous session is required.

As described herein, a telecommunications system wherein management and control utilizing a software designed network (SDN) and an internet protocol are based, at least in part, on user equipment, may provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple Machine-to-Machine (M2M) and Internet of Things (IoT) sensors/devices—through enhanced wireless management.

A 5G network may be overlaid on a 4G LTE network. While the 5G network uses similar functional components as a 4G network, 5G is more aggressive in pushing computational resources to the edge of the networks, including instantiating such computation resources in an edge-based cloud. 5G uses massive multiple input—multiple output (MIMO) antennae which are able to generate multiple targeted beams for each user or a group of users and such targeted beams may even follow devices as they traverse the coverage area. This permits reduced power consumption, improved coverage and bandwidth, lower latency (especially at network cloud edges) and increased capacity, thereby improving coverage, speed and capacity. 5G compliant radios on user equipment and UAVs communicate with the 5G network. Additionally, 5G will allow more uses of network access by internet of things devices.

5G networks may be architected such that 5G network slices, namely an end-to-end instance of a network, may be created for each user or a group of users. Such network slices provide full functionality and scalability for enterprise applications. Moreover, network slices provide increased security.

5G networks may be characterized by lower-power cell sites and which such cell sites are compact and deployed more widely with less coverage area each than comparable 4G cell sites. Each cell site is connected to the network backbone and may operate on three different frequency bands, each with its on characteristics. The resultant connectivity is able to provide increases in speed and reduction in latency.

While examples of a telecommunications system have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, Compact Disc-Read-Only Memory devices (CD-ROMs), Digital Versatile Discs, or, Digital Video Discs (DVDs), hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes a device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, over the air (OTA), or firmware over the air (FOTA), wherein, when the program code is received and loaded into and executed by a machine, such as an Erasable Programmable Read-Only Memory (EPROM), a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

While the disclosure has been described in relation to a generic network, it will be understood that the systems and methods disclosed herein may be deployed in both cellular networks and information technology infrastructure and support current and future use cases. Moreover, the architecture may also be used by carrier or third-party vendors to augment networks on the edge.

As described herein, a telecommunications system wherein management and control utilizing a software designed network (SDN) and a simple IP are based, at least in part, on user equipment, may provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple M2M devices—through enhanced wireless management.

While examples of a telecommunications system have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes a device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

While a telecommunications system has been described in connection with the various examples of the various figures, it is to be understood that other similar implementations may be used, or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, a telecommunications system as described herein should not be limited to any single example, but rather should be construed in breadth and scope in accordance with the appended claims.

In describing preferred methods, systems, or apparatuses of the subject matter of the present disclosure as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose. In addition, the use of the word "or" is generally used inclusively unless otherwise provided herein.

This written description uses examples to enable any person skilled in the art to practice the claimed subject matter, including making and using any devices or systems and performing any incorporated methods. The patentable scope of the disclosed subject matter is defined by the claims and may include other examples that occur to those skilled in the art (e.g., skipping steps, combining steps, or adding steps between exemplary methods disclosed herein). Such other examples are intended to be within the scope of the claims if they have structural elements that do not differ from the literal language of the claims, or if they include equivalent structural elements with insubstantial differences from the literal languages of the claims.

What is claimed:

1. A method comprising:
    capturing traffic associated with a first path between a source domain and a destination domain;
    creating a first traffic digest comprising unique packet identifiers representing the traffic that is captured at the source domain;
    creating a second traffic digest comprising unique packet identifiers representing the traffic that is captured at the destination domain;
    comparing the first traffic digest to the second traffic digest;
    detecting a loss based on the comparing; and
    based on the detecting of the loss:
        determining that an alternative path between the source domain and the destination domain is not available; and
        synchronizing second traffic between the source domain and the destination domain using the first path based on the determining that the alternative path is not available, wherein the second traffic is included in the traffic and is less than an entirety of the traffic.

2. The method of claim 1 wherein the capturing and creating are performed by a traffic digest agent.

3. The method of claim 1 further comprising establishing policies relating to the switching.

4. The method of claim 3 wherein the policies are generated using machine learning algorithms.

5. The method of claim 1 wherein the comparing is performed using a flow conservation rule.

6. The method of claim 1 wherein identical entries in the first traffic digest and the second traffic digest are eliminated from a digest controller as part of the comparing.

7. The method of claim 6 wherein only the remaining entries after the identical entries are eliminated are used in the switching.

8. A system comprising:
a digest controller;
a plurality of traffic digest agents in communication with the digest controller, wherein each traffic digest agent of the plurality of traffic digest agents is configured to capture upstream traffic data and downstream traffic data and to forward identifying information of the upstream traffic data and the downstream traffic data to the digest controller; and
a software defined network in communication with the digest controller, wherein the software defined network is configured as a network cloud having one or more servers, wherein the one or more servers have an input-output interface, a processor coupled to the input-output interface, wherein the processor is further coupled to a memory, the memory having stored thereon executable instructions that when executed by the processor cause the processor to effectuate operations comprising:
receiving comparison data from the digest controller, wherein the comparison data identifies data losses along a first communication path in the software defined network between a first traffic digest agent of the plurality of traffic digest agents and a second traffic digest agent of the plurality of traffic digest agents;
instructing the first traffic digest agent and the second traffic digest agent to cause their respective nodes to resynchronize data transfer therebetween using the first communication path; and
when, in accordance with the instructing, resynchronization does not occur via the first communication path:
instructing the first traffic digest agent and the second traffic digest agent to use an alternative communication path; and
instructing the first traffic digest agent and the second traffic digest agent to cause their respective nodes to resynchronize data transfer using the alternative communication path.

9. The system of claim 8 wherein the digest controller is configured to compare the identifying information of the upstream traffic data and the downstream traffic data using a flow conversation rule, eliminating duplicate identifying information, and sending remaining identifying information to the software defined network.

10. The system of claim 8 wherein the alternative communication path is based on a policy associated with the software defined network.

11. The system of claim 10 wherein the policy is updated based on using the alternative communication path.

12. The system of claim 8 wherein the alternative communication path uses a satellite node configured to communicate between the respective nodes of the first traffic digest agent and the second traffic digest agent.

13. The system of claim 8 further comprising an analytics module configured to receive the identifying information of the upstream traffic data and the downstream traffic data from the digest controller, compare the identifying information of the upstream traffic data and the downstream traffic data, eliminating duplicate identifying information, and sending remaining identifying information to the software defined network.

14. The system of claim 13 wherein the analytics module is further configured to dynamically determine a policy.

15. The system of claim 14 wherein alternative paths utilized by the software defined network and end-to-end network usage statistics are used to update the policy.

16. The system of claim 15 wherein the updated policy is determined using a machine learning algorithm.

17. The system of claim 8 further comprising a quantum module associated with a plurality of nodes in the system, wherein the quantum module is configured to provide enhanced speed of data and control flow between the plurality of nodes.

18. A system, comprising:
a plurality of traffic digest agents, each traffic digest agent of the plurality of traffic digest agents configured to capture data transferred to and from a node via a respective first communications path and to create unique identifiers associated with the captured data; and
a digest controller in communication with the plurality of traffic digest agents and configured to receive the unique identifiers associated with the captured data, compare the unique identifiers and eliminate duplicate captured data based on the comparison of the unique identifiers to identify lost data packets, and transmit remaining unique identifiers to a controller in a software defined network,
wherein the digest controller is configured to: determine whether an alternative communications path is available for each node associated with the lost data packets, resulting in a determination, instruct each node associated with the lost data packets to use the alternative communications path to resynchronize the data transfer between each node associated with the lost data packets when the alternative communications path is available in accordance with the determination, and instruct each node associated with the lost data packets to use the respective first communications path to synchronize respective second lost data packets involving the node when the alternative communications path is not available in accordance with the determination, the second lost data packets for the node being included in the lost data packets for the node and being less than an entirety of the lost data packets for the node.

19. The system of claim 18 wherein the alternative communications path is chosen according to a policy, the system further comprising:
an analytics module in communication with the digest controller and configured to determine the policy using a machine learning algorithm.

20. The system of claim 19 further comprising a quantum module associated with each node, the quantum module configured to provide security to transmission paths between each node.

* * * * *